(12) United States Patent
Manabe

(10) Patent No.: US 11,812,000 B2
(45) Date of Patent: Nov. 7, 2023

(54) INSPECTION APPARATUS THAT COVERTS A RESULT OF SHEET INSPECTION INTO AN INSPECTION RESULT OF EACH BOOK INCLUDING A PLURALITY OF SHEETS, METHOD FOR CONTROLLING THE SAME, AND IMAGE FORMING SYSTEM

(71) Applicant: Canon Kabushiki Kaisha, Tokyo (JP)

(72) Inventor: Koichiro Manabe, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/552,672

(22) Filed: Dec. 16, 2021

(65) Prior Publication Data

US 2022/0201150 A1   Jun. 23, 2022

(30) Foreign Application Priority Data

Dec. 17, 2020 (JP) .................................. 2020-209552
Aug. 12, 2021 (JP) .................................. 2021-131744

(51) Int. Cl.
*H04N 1/32* (2006.01)
*H04N 1/00* (2006.01)

(52) U.S. Cl.
CPC ....... *H04N 1/3263* (2013.01); *H04N 1/00018* (2013.01); *H04N 1/00037* (2013.01); *H04N 1/00639* (2013.01); *H04N 1/32667* (2013.01)

(58) Field of Classification Search
None
See application file for complete search history.

(56) References Cited

U.S. PATENT DOCUMENTS

| 2011/0179961 | A1* | 7/2011 | Yanagawa | G06F 3/1256 |
| | | | | 101/483 |
| 2018/0059603 | A1* | 3/2018 | Miyahara | H04N 1/00076 |
| 2020/0356318 | A1* | 11/2020 | Wei | G06F 3/1234 |

FOREIGN PATENT DOCUMENTS

JP    2019209504 A    12/2019

* cited by examiner

*Primary Examiner* — Andrew H Lam
(74) *Attorney, Agent, or Firm* — Venable LLP

(57) ABSTRACT

An inspection apparatus is provided, which is operable to inspect a cut sheet that is supplied to a post-processing apparatus that post-processes sheets in units of hooks and on which an image has been formed by an image forming apparatus. The inspection apparatus inspects an image formed on a sheet for each sheet; manages results of sheet inspection by the inspection unit for respective books including a plurality of sheets; and notifies, the post-processing apparatus of a result of inspecting a book including the sheet that is based on the managed sheet inspection results.

17 Claims, 25 Drawing Sheets

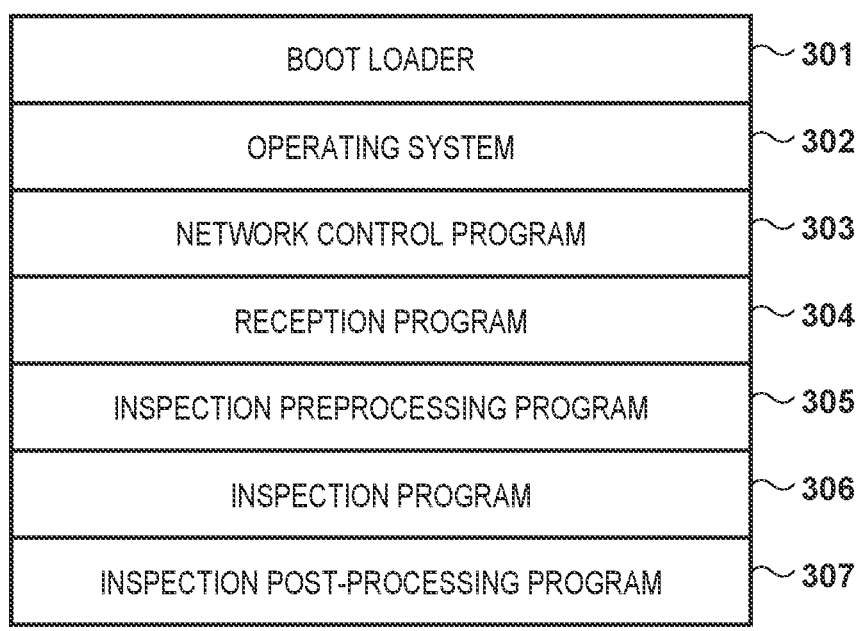

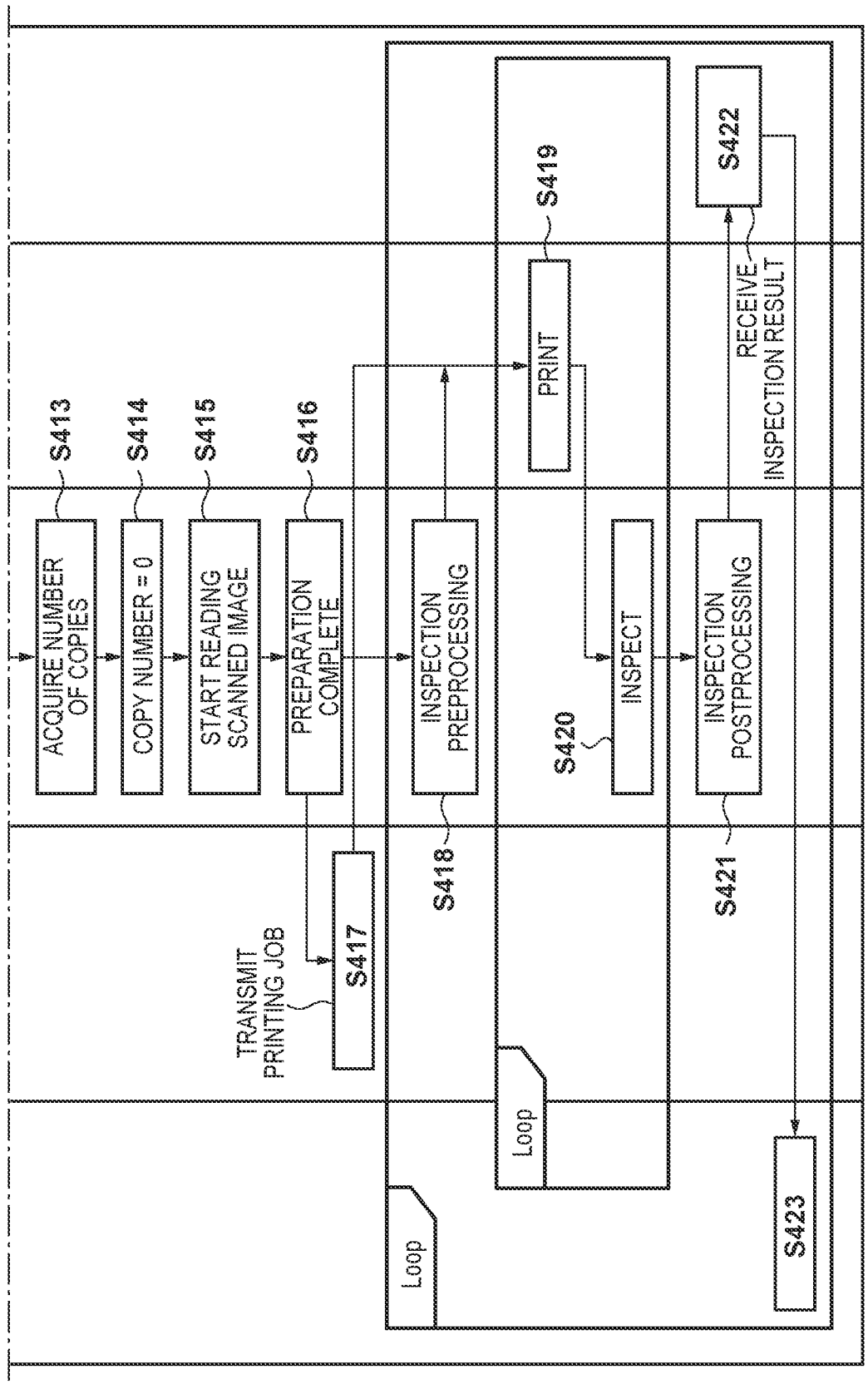

FIG. 6

```
        <?xml version="1.0" encoding="UTF-8"?>
600 ~~<JobTicket>
         <PrinterName>color printer1</PrinterName>
601 ~~<JobID>ID01</JobID>
602 ~~<RefImgID>ProductAAA</RefImgID>
603 ~~<NumberOfCopies>100</NumberOfCopies>
604 ~~<NumberOfScan></NumberOfScan>
605 ~~<Collate>None</Collate>
606 ~~<Sides>TwoSidedFlipY</Sides>
607 ~~<MediaSize>842 1191</MediaSize>
608 ~~<Sheets>300</Sheets>
    </JobTicket>
```

FIG. 7A

| BookID | Barcode | Page | Time | Result |
|---|---|---|---|---|
| 0012 | 0460160004120324-1 | 1 | 2020/06/12 11:42:01 | OK |
| | | 2 | 2020/06/12 11:42:02 | OK |
| | | 3 | 2020/06/12 11:42:03 | OK |
| | | 4 | 2020/06/12 11:42:05 | NG |
| | | 5 | ——— | ——— |

| BookID | Barcode | Time | Result |
|---|---|---|---|
| 0012 | 0460160004120324-1 | 2020/06/12 11:42:12 | NG |

706, 707, 708, 709, 710

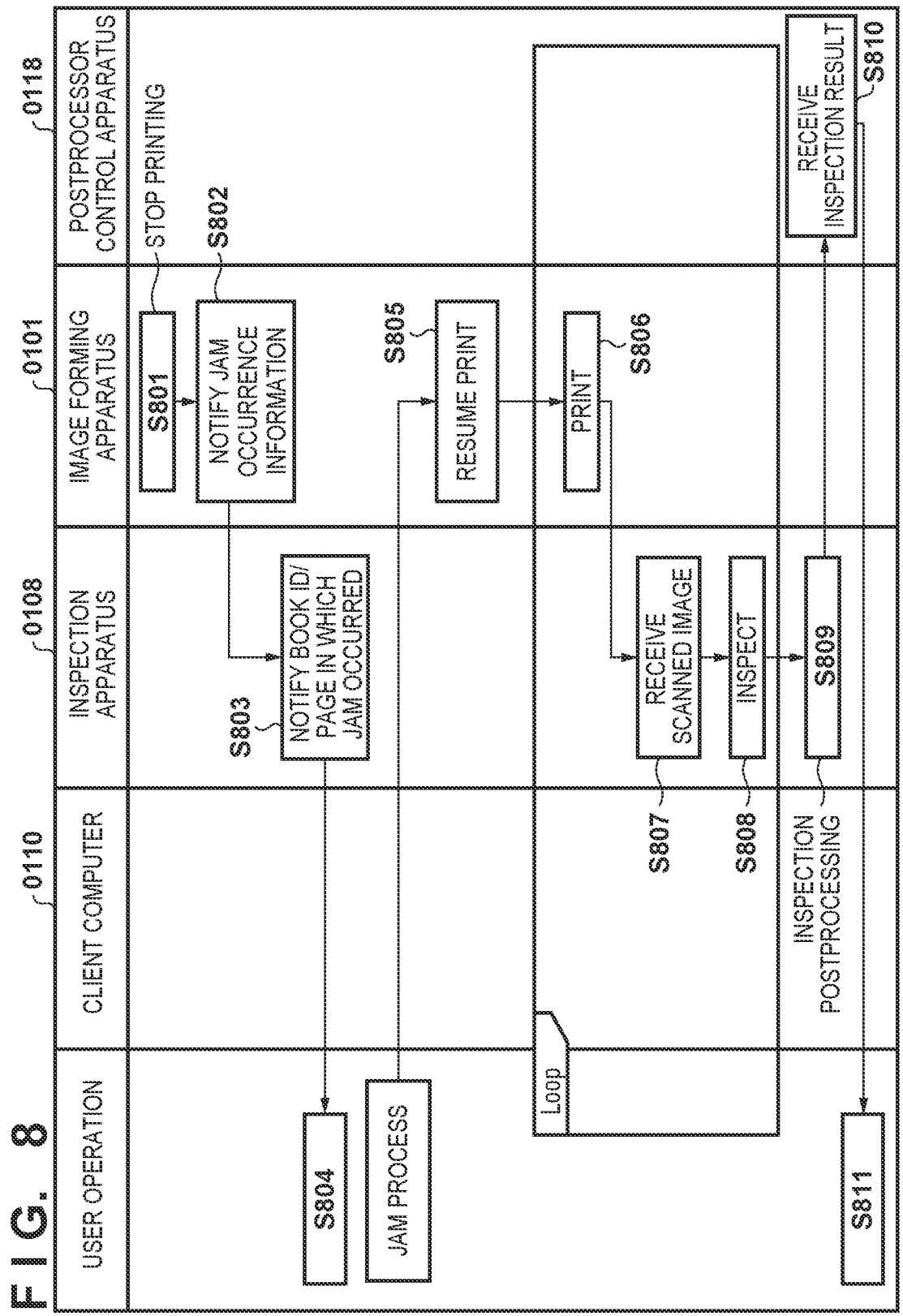

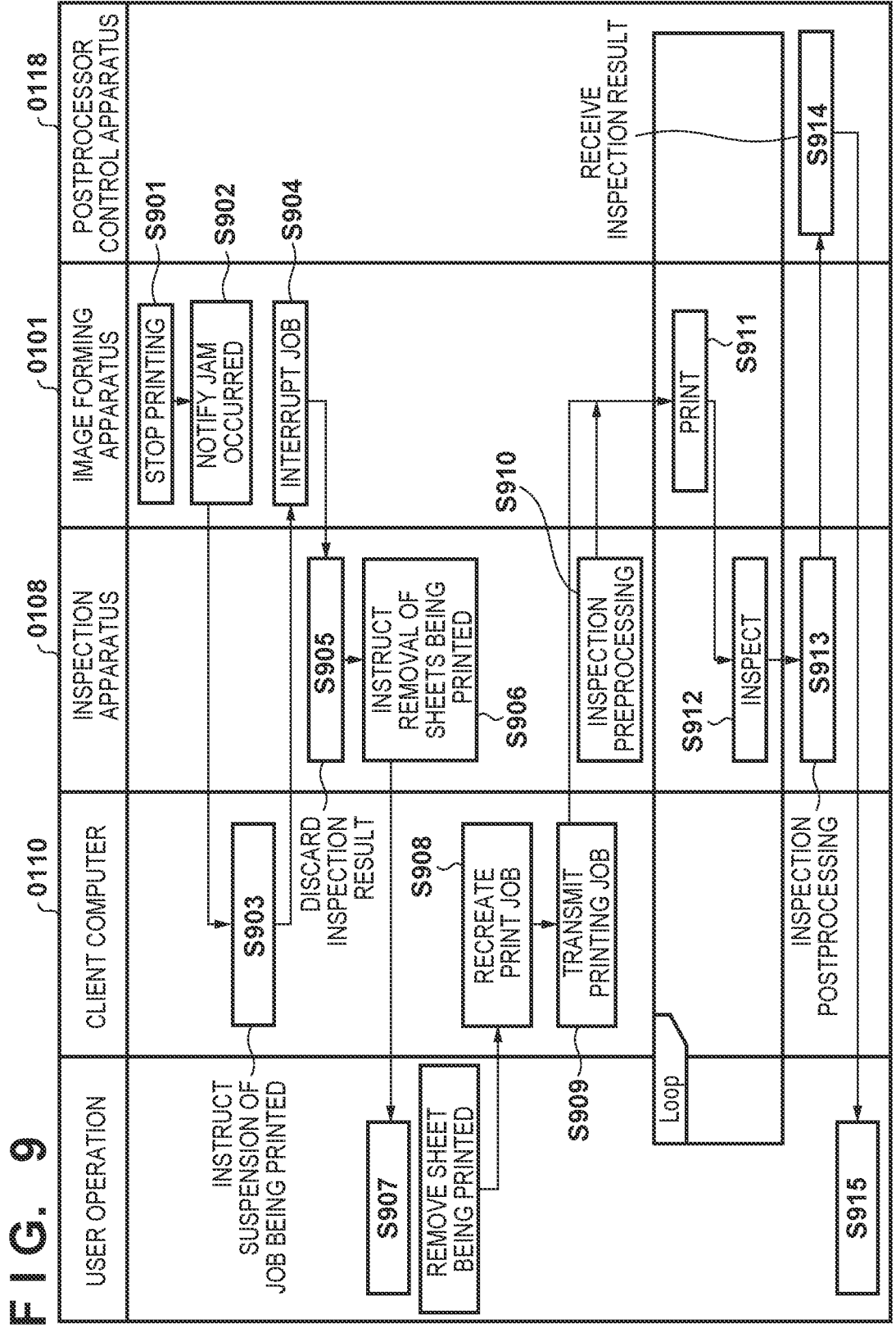

FIG. 13

| JobID | BinderID | Page | Submit | Eject |
|---|---|---|---|---|
| 1000 | 1 | 1 | ✓ | ✓ |
| | | 2 | ✓ | ✓ |
| | | ⋮ | ⋮ | ⋮ |
| | | 99 | ✓ | ✓ |
| | | 100 | ✓ | ✓ |
| | 2 | 1 | ✓ | ✓ |
| | | 2 | ✓ | ✓ |
| | | ⋮ | ⋮ | ⋮ |
| | | 99 | ✓ | ✓ |
| | | 100 | ✓ | ✓ |
| | 3 | 1 | ✓ | ✓ |
| | | 2 | ✓ | ✓ |
| | | ⋮ | ⋮ | ⋮ |
| | | 89 | ✓ | ✓ |
| | | 90 | ✓ | |
| | | 91 | ✓ | |
| | | 92 | | |
| | | ⋮ | ⋮ | ⋮ |
| | | 99 | | |
| | | 100 | | |
| | 4 | ⋮ | ⋮ | ⋮ |
| | ⋮ | ⋮ | ⋮ | ⋮ |
| | 10 | ⋮ | ⋮ | ⋮ |

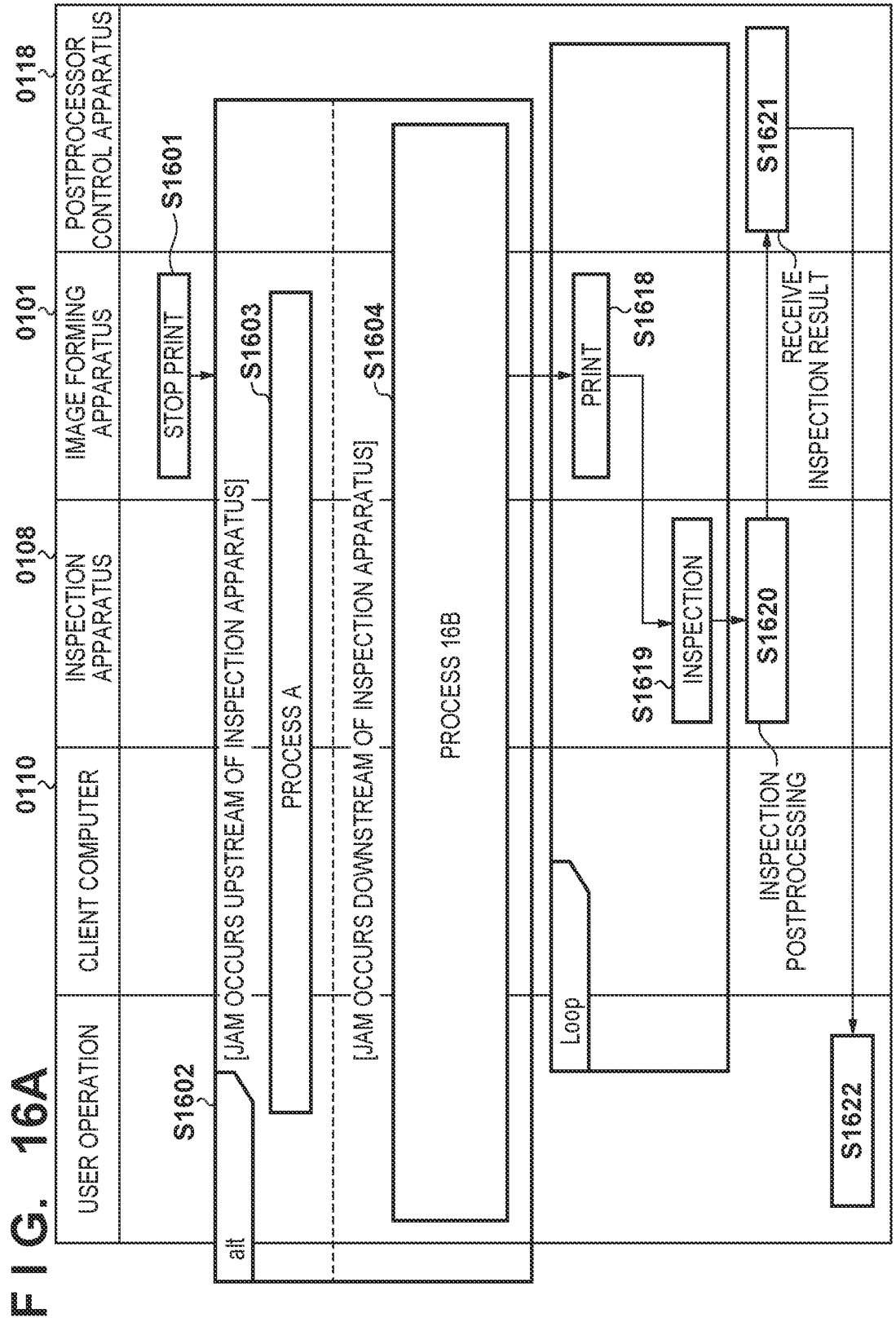

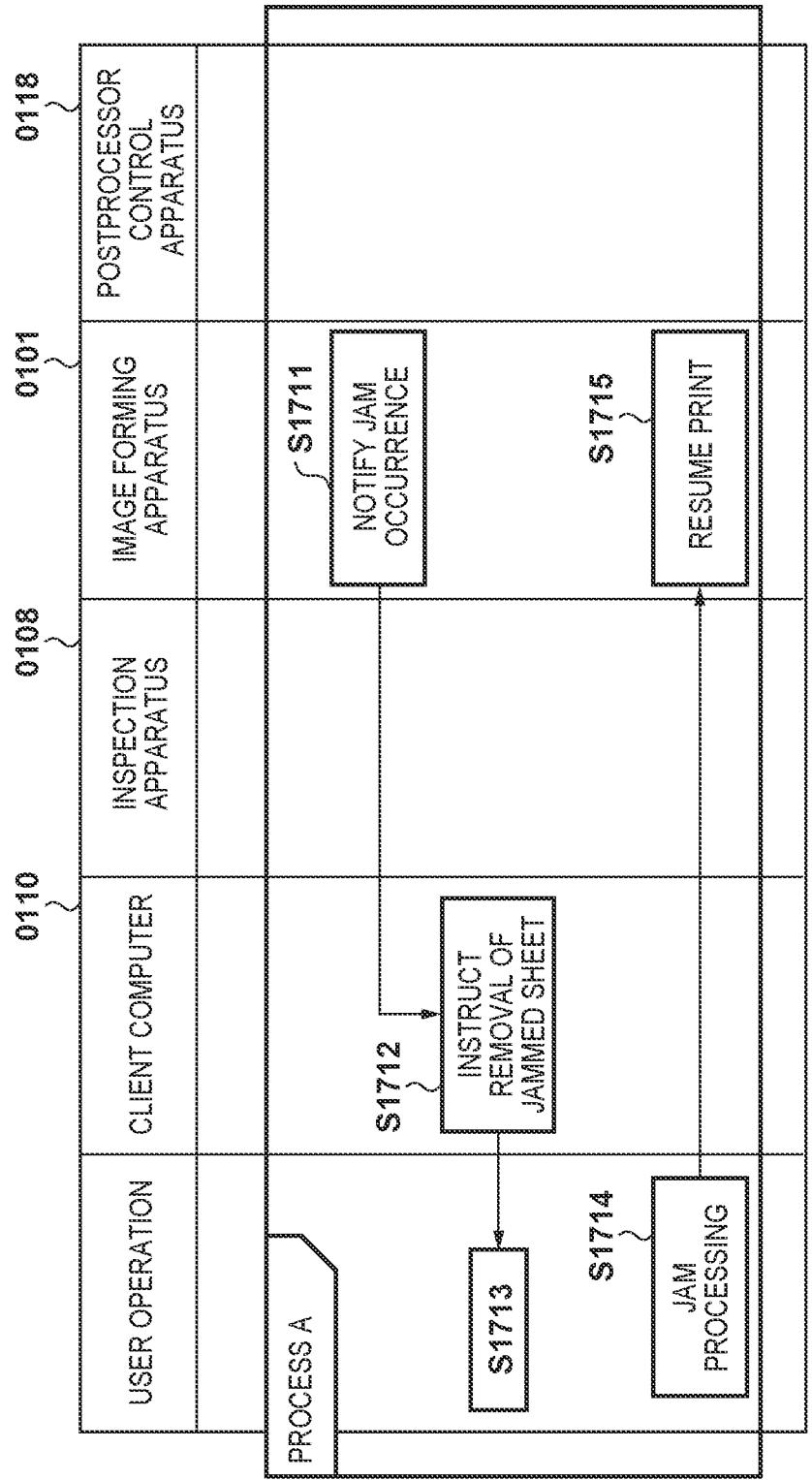

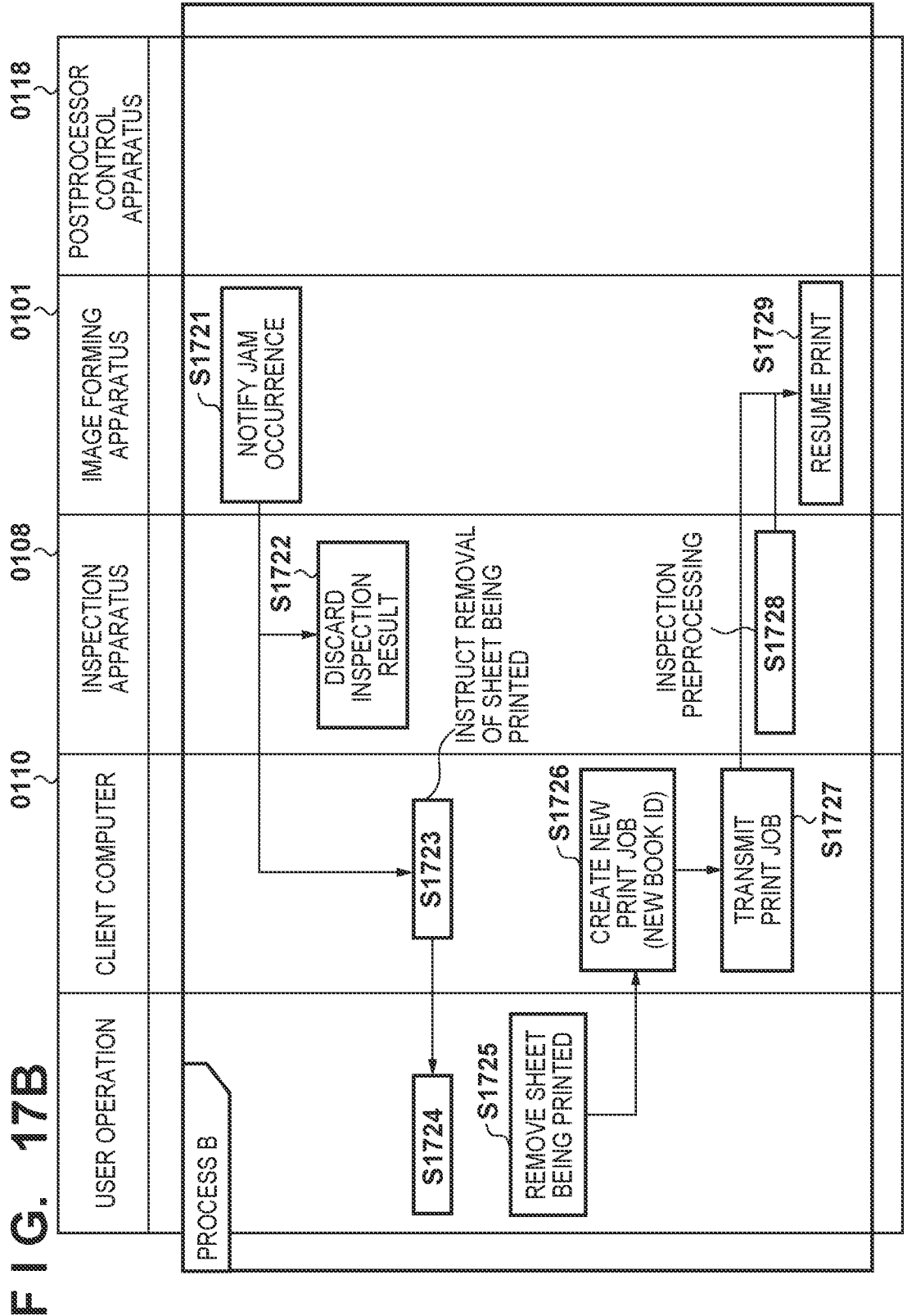

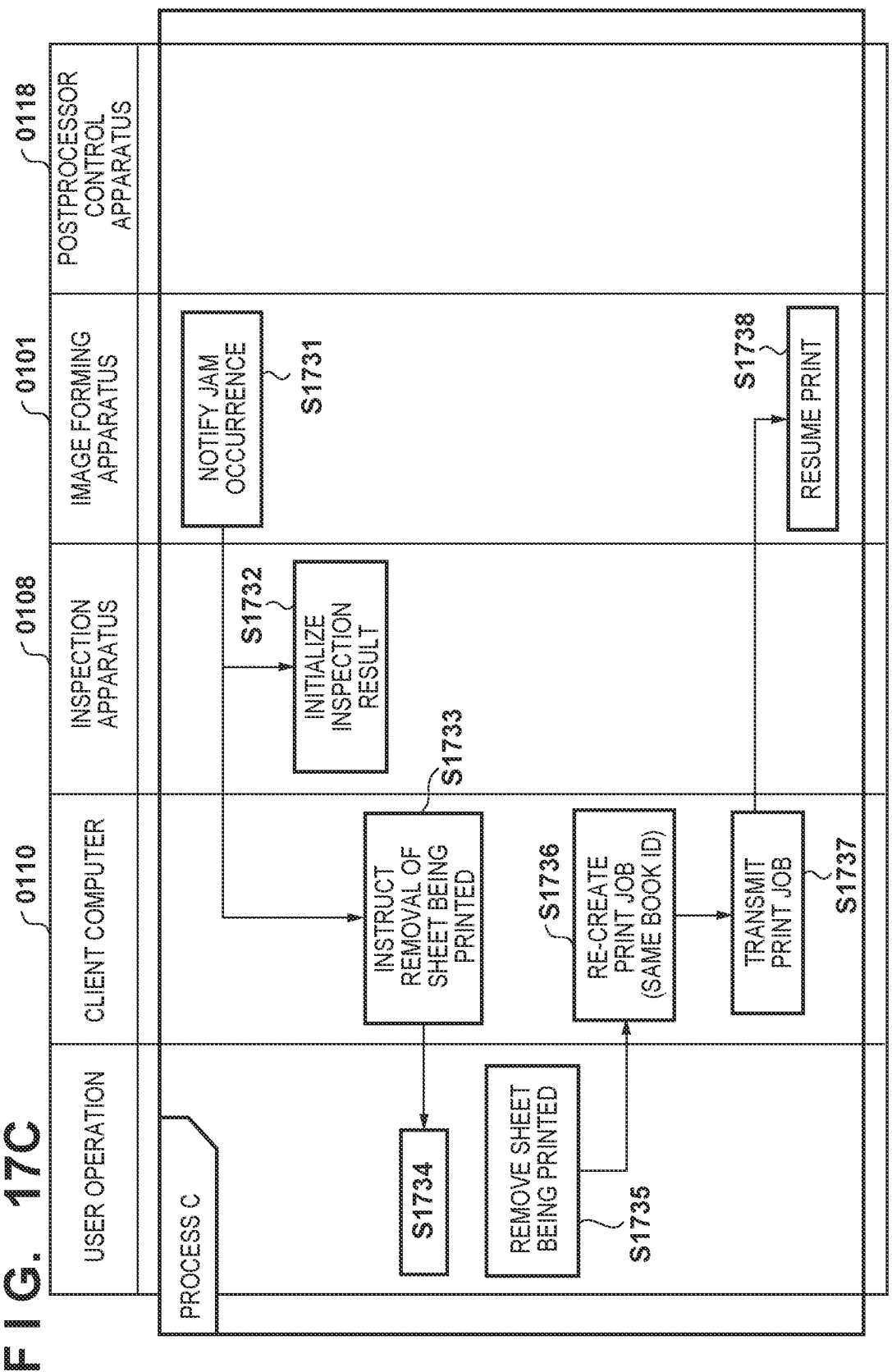

FIG. 18

| JobID | BinderID | Page | Inspected | Eject |
|---|---|---|---|---|
| 1000 | 1 | 1 | ✓ | ✓ |
| | | 2 | ✓ | ✓ |
| | | ⋮ | ⋮ | ⋮ |
| | | 99 | ✓ | ✓ |
| | | 100 | ✓ | ✓ |
| | 2 | 1 | ✓ | ✓ |
| | | 2 | ✓ | ✓ |
| | | ⋮ | ⋮ | ⋮ |
| | | 99 | ✓ | ✓ |
| | | 100 | ✓ | |
| | 3 | 1 | ✓ | |
| | | 2 | | |
| | | ⋮ | | |
| | | 99 | | |
| | | 100 | | |

_(54)_ INSPECTION APPARATUS THAT COVERTS A RESULT OF SHEET INSPECTION INTO AN INSPECTION RESULT OF EACH BOOK INCLUDING A PLURALITY OF SHEETS, METHOD FOR CONTROLLING THE SAME, AND IMAGE FORMING SYSTEM

BACKGROUND OF THE INVENTION

Field of the Invention

The present invention relates to an inspection apparatus, a control method of the inspection apparatus, an image forming system for inspecting print quality of print materials in a cutsheet printing machine, for example.

Description of the Related Art

An inspection apparatus for reading print materials printed by an image forming apparatus and inspecting the quality thereof is known. The inspection apparatus is capable of detecting image defects such as dirt and printing omission, character errors, barcode quality, and the like. This ensures the quality of deliverables without manual intervention.

In the commercial printing field, a post-processing apparatus such as a bookbinding machine connected to a continuous feed printer generally performs processing based on the characteristics of the continuous feed printer. Taking book printing as an example, a continuous feed printer that performs printing on rolled paper performs printing and inspection on a roll-by-roll basis. Thereafter, the printed roll is set in a cutting machine and cut to form sheets. Generally, a continuous feed printer is characterized in that printing is not stopped during printing, and printing continues until the end of the printing job even if a defect is detected. Therefore, a post-processing apparatus connected to the continuous feed printer has a feature of performing processing in units of books after cutting, such as discarding a sheet bundle including a sheet in which a defect is detected after roll cutting.

Meanwhile, in the case of a cutsheet device that prints on cut paper, cutting is unnecessary, so that the process up to printing, inspection, and making book units can be performed as a series of processes, and high productivity can be realized. Cutsheet devices have a characteristic in that information of a sheet for which a defect is detected is notified for each sheet, and processing is performed in units of sheets to separate corresponding sheets from sheets without a defect by discharging them to defect discharge tray (Japanese Patent Laid-Open No. 2019-209504). As a feature of the inspection in a cutsheet device, it is possible to create a book without a defect by re-printing a sheet in which a defect has been detected, unlike a continuous teed printer.

However, it is generally known that the process of reprinting a sheet in which a defect is detected lowers the productivity of the cutsheet device. Factors that may cause the productivity to decrease include the need for changing the discharge destination and reprinting a subsequent printed sheet at a time when a defect is detected, and the need for reconfiguring print data for reprinting. For this reason, even in the cutsheet device, it is possible to improve productivity by not stopping printing even if a defect is detected, as in the case of a continuous feed printer.

However, when a cutsheet device is connected to a post-processing apparatus fit to a continuous feed printer, since the units of processing are different between the cutsheet device and the post-processing apparatus at the time of defect detection, it was difficult to avoid performing re-printing at the time of defect detection. For example, while the cutsheet device performs processing by the sheet, a post-processing apparatus matching the continuous feed printer performs processing in units of books, and processing cannot be performed in units of sheets. Therefore, in the case where the output product of the cutsheet device is post-processed by a post-processing apparatus matching the continuous feed printer, it is necessary to keep defective products out of the print materials to be processed by the continuous feed printer. Therefore, when a cutsheet device is connected to a post-processing apparatus for a continuous feed printer, it is necessary to change the discharge destination of a sheet for which a defect has been detected and print that sheet again, and it is impossible to realize a mode in which printing is continued even when a defect is detected and processing is performed by the post-processing apparatus in units of books.

SUMMARY OF THE INVENTION

In the present invention, a cutsheet device is connected to a post-processing apparatus for a continuous feed printer to produce high quality print materials with high productivity.

The present invention has the following configurations. According to an aspect of the present invention, there is provided an inspection apparatus operable to inspect a cut sheet that is supplied to a post-processing apparatus that post-processes sheets in units of books and on which an image has been formed by an image forming apparatus, the inspection apparatus comprising: an inspection unit configured to inspect an image formed on each sheet; and one or more processors and one or more memory comprising one or more programs, wherein the one or more programs are configured to cause the one or more processors to: manage a result of sheet inspection by the inspection unit for each book including a plurality of sheets; and notify the post-processing apparatus of the result of sheet inspection for a book including the sheet that is based on the managed sheet inspection results.

According to another aspect of the present invention, there is provided an image forming system comprising: an image firming apparatus configured to form an image on a cut sheet; an inspection apparatus configured to inspect an image formed on a sheet by the image forming apparatus; and a control apparatus configured to control the image forming apparatus and the inspection apparatus, wherein the inspection apparatus comprises an inspection unit configured to inspect an image formed on a sheet for each sheet; one or more processors and one or more memory comprising one or more programs, wherein the one or more programs are configured to cause the one or more processors to: manage results of sheet inspection by the inspection unit for respective books including a plurality of sheets; and notify a post-processing apparatus of a result of inspecting a hook including the sheet that is based on the managed sheet inspection results.

By virtue of the present invention, a cutsheet device can be connected to a post-processing apparatus for a continuous feed printer to produce high quality print material with high productivity.

Further features of the present invention will become apparent from the following description of exemplary embodiments with reference to the attached drawings.

BRIEF DESCRIPTION OF THE DRAWINGS

FIG. 3 is a software configuration diagram of an inspection apparatus in the first embodiment.

FIG. 4A and FIG. 4B are system flowcharts for an entire inspection process system in the first embodiment.

FIG. 6 is a view illustrating an example of a sheet inspection result table by the inspection apparatus in the first embodiment.

FIG. 7A and FIG. 7B are views illustrating an example of files for the results of inspections by the inspection apparatus in the first embodiment.

FIG. 8 is a system flowchart for an entire inspection process system in a second embodiment.

FIG. 9 is a system flowchart for an entire inspection process system in a third embodiment.

FIG. 13 is a diagram illustrating an example of job status information

FIG. 16A is a flowchart for an entire inspection process system in a seventh embodiment.

FIG. 17A is a flowchart for a process A in the fifth to seventh embodiments.

FIG. 17B is a flowchart for a process B in the fifth to seventh embodiments.

FIG. 17C is a flowchart for a process C.

FIG. 18 is a diagram illustrating an example of inspection status information

DESCRIPTION OF THE EMBODIMENTS

Figure 1:
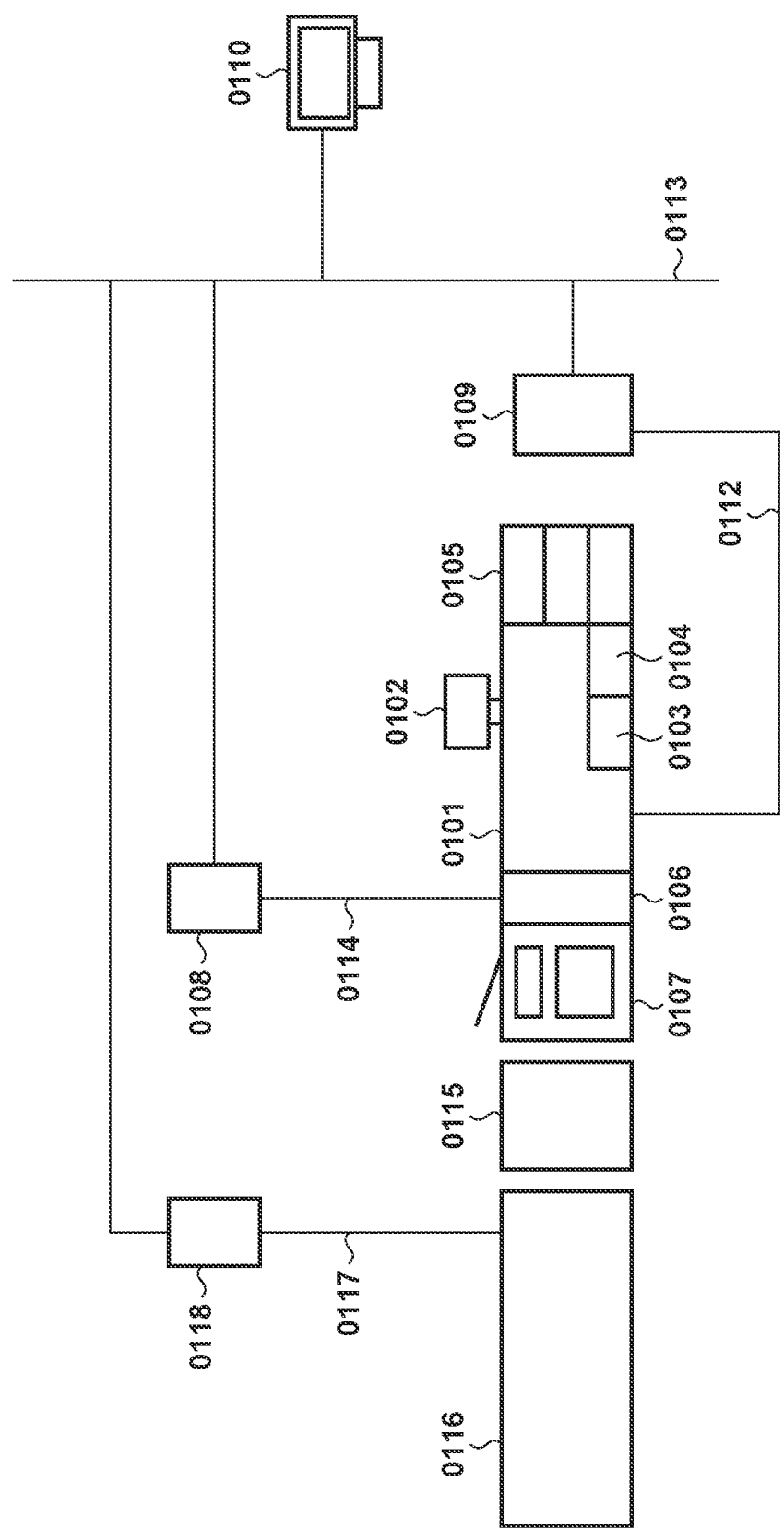
FIG. 1 is a block diagram illustrating the entire print processing system in a first embodiment.

Hereinafter, embodiments will be described in detail with reference to the attached drawings. Nate, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Print Processing System [FIG. 1]

FIG. 1 is a block diagram illustrating the entire print processing system (also referred to as an image forming system) according to the present embodiment. Although the image forming apparatus of the present embodiment will be described as an electrophotographic image forming apparatus, the image forming apparatus may use a different image forming method such as an ink jet method or an offset method.

An image forming apparatus 0101 is communicably connected to an information processing apparatus 0109 via a cable 0112. The information processing apparatus 0109 is connected to a client computer 0110 and an inspection apparatus 0108 via a network 0113.

The image forming apparatus 0101 includes a UI panel 0102, a sheet feeding deck 0103, and a sheet feeding deck 0104. Additionally, an optional deck 0105 consisting of three stages of paper feed decks is connected. Cutsheets, which are print sheets that are already cut to a predetermined size, are placed on the sheet feeding decks 0103, 0104, and 0105. The size of the sheets placed on the respective sheet feeding decks may be the same, or may be different for each sheet feeding deck. The image forming apparatus 0101 is, for example, an electrophotographic image forming apparatus. The UI panel 0102 is, for example, a user interface including a capacitive touch panel.

The image forming apparatus 0101 further includes an inspection unit 0106 and a large-capacity stacker 0107. The inspection unit 0106 is connected to the inspection apparatus 0108 via a cable 0114. A sheet on which an image has been formed by the image forming apparatus 0101 is read by the inspection unit 0106, and the quality of an image turned on the sheet is inspected by the inspection apparatus 0108. In the present embodiment to the seventh embodiment, the inspection apparatus 0108 only displays inspection results on the display unit 0245, and also discharges a sheet for which the inspection result is "fail" or "defective product (NG)" to a discharge destination as normal. The large-capacity stacker 0107 includes a main tray and a top tray, and the main tray can stack thousands of sheets at a time. In the present embodiment, sheets on which an image has been formed are not placed on the large-capacity stacker 0107, but is conveyed to a buffer unit 0115 connected in-line on the conveying path. Note that the inspection apparatus 0108 and the inspection unit 0106 may be referred to as the inspection apparatus.

The buffer unit 0115 stacks sheets on which an image has been formed by the image forming apparatus 0101, and creates sheet bundles in units of books. This bundled book unit may be referred to as a book or a copy. In addition, even if printing of all pages included in a book has not been completed and the book is incomplete, the book may be referred to as a book. In the present embodiment, a continuous feed printer is connected to the buffer unit 0115. The roll paper printed by the continuous feed printer is set in a cutting machine and cut to form a printed sheet. The cut printed sheets are formed into sheet bundles in units of books by the buffer unit 0115. In the present embodiment, the buffer unit 0115 is connected in-line to a continuous feed printer postprocessor 0116 by a conveyance path. The image formed (printed) sheet bundles (paper bundles) in units of books are sent to the continuous feed printer postprocessor 0116, and are supplied as a target of processing by a continuous feed printer postprocessor 0116. Note that the buffer unit 0115 is required to remove paper including a sheet bundle that is stacked when a paper jam or the like occurs in the machine due to the nature of creating the sheet bundle in units of books. In other words, in the continuous feed printer system, after the buffer unit 0115, processing is executed in units of books. A continuous feed printer postprocessor 0116 is connected to the postprocessor control apparatus 0118 via a cable 0117. The postprocessor control apparatus 0118 is connected to the inspection apparatus 0108 via the network 0113. The continuous feed primer postprocessor 0116 is, for example, an adhesive binding bookbinding machine, and has a function of binding sheet bundles in units of books. In the case where the postprocessing apparatus 0116 is a continuous feed apparatus, the postprocessor control apparatus 0118 may discharge or process a book for which the inspection result, in units of books, is NG in a manner distinguishable from a book for which the inspection result is "success" or non-defective product (OK).

The print job is generated by the client computer 0110, transmitted to the information processing apparatus 0109 through the network 0113, and managed by the information processing apparatus 0109. The print job is transmitted from the information processing apparatus 0109 to the image forming apparatus 0101 through the cable 0112, and the image forming apparatus 0101 performs processing for forming an image on a sheet. The print job may be generated and managed by the information processing apparatus 0109, transmitted to the image forming apparatus 0101 via the network 0112, and managed by the image forming apparatus 0101.

Note that the client computer 0110, the information processing apparatus 0109, and the inspection apparatus 0108 may be connected to a cable 0112 to communicate with the image forming apparatus 0101. That is, the form in which the image forming apparatus 0101, the information processing apparatus 0109, and the client computer 0110 are connected illustrated in the present embodiment is merely an example, and it is needless to say that there are various other connection forms besides the connection form illustrated in the present embodiment.

Figure 2:
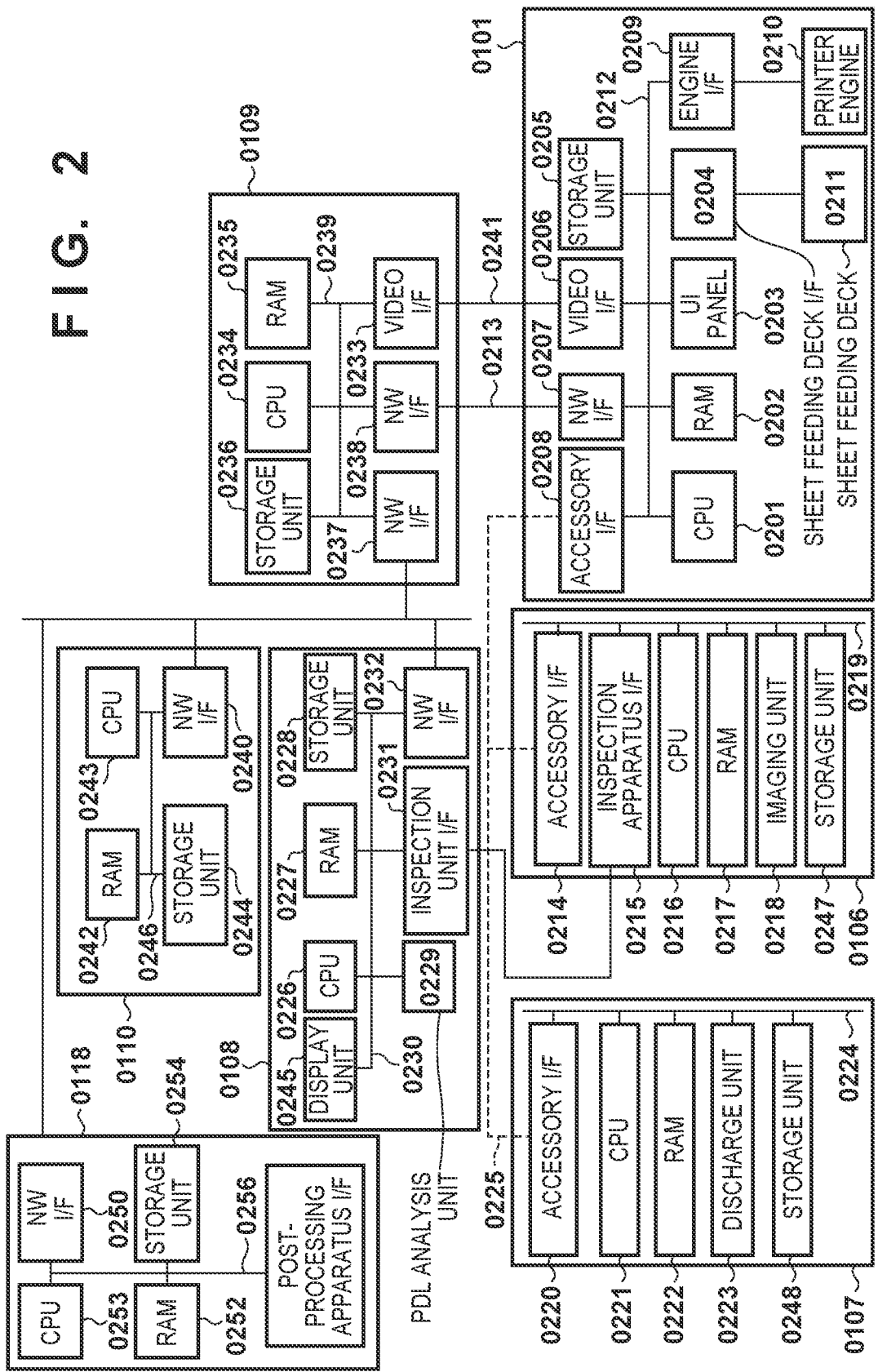
FIG. 2 is a hardware configuration diagram of an information processing apparatus, an inspection apparatus, and an image forming apparatus according to the first embodiment.

Configuration of Each Device [FIG. 2]

FIG. 2 is a block diagram illustrating a control configuration of the image forming apparatus 0101, the inspection apparatus 0108, the large-capacity stacker 0107, the information processing apparatus 0109, and the client computer 0110.

<Image Forming Apparatus>

A central processing unit (CPU) 0201 controls and performs operations of each unit of the image forming apparatus 0101 via a system bus 0212. The CPU 0201 controls the execution of a program that is stored in a non-volatile storage unit 0205 and loaded into the RAM (Random Access Memory) 0202. The RAM 0202 is a general-purpose type of volatile storage apparatus that can be accessed directly from the CPU 0201 and is used as a work area for the CPU 0201 or as another temporary data storage region. The storage unit 0205 functions as a temporary storage area and a work memory at the time of operation of the image forming apparatus.

An engine I/F 0209 communicates with and controls a printer engine 0210. A sheet feeding deck I/F 0204 communicates with and controls the sheet feeding deck 0211. The sheet feeding deck 0211 collectively refers to the sheet feeding decks 0103 and 0104 and the optional deck 0105 as a hardware configuration. A UI panel 0203 is a hardware configuration of the UI panel 0102, and is a user interface for performing all operations of the image forming apparatus 0101. In the present embodiment, it is assumed that the UI panel 0203 includes a touch panel of a capacitance type.

A network interface (hereinafter, NW I/F) 0207 is connected to a NW I/F 0238 of the information processing apparatus 0109 via a cable 0213, and controls communication between the information processing apparatus 0109 and the image forming apparatus 0101. In this example, the interfaces connected to the system buses 0212 and 0239 are directly connected, but the information processing apparatus 0109 and the image forming apparatus 0101 may be connected to each other by, for example, a network or the like, and the connection format is not limited. The video I/F 0206 is connected to a video I/F 0233 via a video cable 0241, and controls communication of image data between the information processing apparatus 0109 and the image forming apparatus 0101.

The connection interface of the information processing apparatus 0109 connected to the image forming apparatus 0101 may be of a form in which the functions of the NW I/F 0238 and the video I/F 0233 are integrated. The connection interface of the information processing apparatus 0109 connected to the image forming apparatus 0101 may be of a form in which the functions of the NW I/F 0207 and the video I/F 0206 are integrated.

The accessory I/F 0208 connects to an accessory I/F 0214 of the inspection unit 0106 and an accessory I/F 0220 of the large-capacity stacker 0107 via a cable 0225. That is, the image forming apparatus 0101 communicates with the inspection unit 0106 and the large-capacity stacker 0107 via the accessory I/Fs 0208, 0214 and 0220.

<Inspection Unit>

A CPU 0216 controls and calculates for each unit in the inspection unit 0106 via a system bus 0219, and executes a program stored in a storage unit 0247 and loaded into the RAM 0217. The RAM 0217 is a general-purpose type of volatile storage apparatus that can be accessed directly from the CPU 0216 and is used as a work area for the CPU 0216 or as another temporary data storage region. The storage unit 0247 functions as a temporary storage area and a work memory at the time of operation of the inspection apparatus. An inspection apparatus I/F 0215 is connected to an inspection apparatus unit I/F 0231 via a cable 0248. That is, the inspection unit 0106 communicates with the inspection apparatus 0108 via the inspection apparatus I/F 0215 and an inspection apparatus unit I/F 0231.

An imaging unit 0218 has a capturing function wherein a contact image sensor (hereinafter, CIS), for example, is mounted, and captures a sheet passing through the inside of an inspection unit, and transmits the captured image to the inspection apparatus 0108 via the inspection apparatus I/F 0215. Incidentally, the CIS for the imaging unit 0218 is only one example of the sensor, and other types of sensors such as a CCD image sensor may be used, and the capturing method is not limited. Since the inspection targets of the inspection unit 0106 are printed sheets to be bound, image sensors for capturing the front and back sides, respectively may be provided so that both sides can be captured simultaneously.

<Large-Capacity Stacker>

The CPU 0221 controls and calculates for each unit in the large-capacity stacker 0107 via a system bus 0224, and executes a program stored in a storage unit 0248 and loaded into the RAM 0222. The RAM 0222 is a general-purpose type of volatile storage apparatus that can be accessed directly from the CPU 0221 and is used as a work area for the CPU 0221 or as another temporary data storage region. The storage unit 0248 functions as a temporary storage area and a work memory at the time of operation of the large capacity stacker. The discharge unit 0223 performs a discharge operation to the main tray and the top tray, and monitors and controls the stacking state of each of the main tray and the top tray.

<Inspection Apparatus>

A CPU 0226 controls and calculates for each unit in the inspection apparatus 0108 via a system bus 0230, and executes a program stored in a storage unit 0228 and loaded into the RAM 0227. The RAM 0227 is a general-purpose type of volatile storage apparatus that can be accessed directly from the CPU 0226 and is used as a work area for the CPU 0226 or as another temporary data storage region. The storage unit 0228 functions as a temporary storage area and a work memory at the time of operation of the inspection apparatus. A PDL analysis unit 0229 executes reading/interpretation processing for PDF, PostScript (registered trademark), and PDL data such as PCL received from the client computer 0110 or the information processing apparatus 0109. The display unit 0245 is a liquid crystal display connected to the inspection apparatus, for example, and accepts user input to the inspection apparatus, and displays the state of the inspection apparatus.

<Information Processing Apparatus>

The CPU 0234 controls and calculates for each unit in the information processing apparatus 0109 via a system bus 0239, and executes a program stored in a storage unit 0236 and loaded into the RAM 0235. The RAM 0235 is a general-purpose type of volatile storage apparatus that can be accessed directly from the CPU 0234 and is used as a work area for the CPU 0234 or as another temporary data storage region. The storage unit 0236 functions as a temporary storage area and a work memory at the time of operation of the information processing apparatus. A network interface (hereinafter, NW I/F) 0237 is connected to NW I/Fs 0232 and 0240 via a network. The information processing apparatus 0109 communicates with the inspection apparatus 0108 via NW I/F 0237 and NW I/F 0232. The information processing apparatus 0109 communicates with the client computer 0110 via NW I/F 0237 and NW I/F 0240.

<Client Computer>

The CPU 0243 controls and calculates for each unit in the client computer 0110 via a system bus 0246, and executes a program stored in a storage unit 0244 and loaded into the RAM 0242. The RAM 0242 is a general-purpose type of volatile storage apparatus that can be accessed directly from the CPU 0243 and is used as a work area for the CPU 0243 or as another temporary data storage region. The storage unit 0244 functions as a temporary storage area and a work memory at the time of operation of a client computer.

<Postprocessor Control Apparatus>

A CPU 0253 is connected to continuous feed printer postprocessor 0116 via the system bus 0256, and controls and calculations in the respective units in the postprocessor control apparatus 0118, and executes programs stored in the storage unit 0254 and loaded into a RAM 0252. The RAM 0252 is a general-purpose type of volatile storage apparatus that can be accessed directly from the CPU 0253 and is used as a work area for the CPU 0253 or as another temporary data storage region. The storage unit 0254 functions as a temporary storage area and a work memory at the time of operation of a continuous feed printer post-processing apparatus. In the present embodiment, it is assumed that the RAM 0252 has a storage area shared with the inspection apparatus 0108. The shared storage area can be accessed by the postprocessor control apparatus 0118 and the inspection apparatus 0108, and data, in particular, tiles can be read and written. In the shared storage area, a book inspection result file, which will be described later, is stored. This makes it possible to share the inspection results of inspections by the inspection apparatus 0108. However, the postprocessor control apparatus 0118 in the present embodiment is a system constructed for a continuous feed printer system. Even if a defect is detected in the inspection apparatus, printing continues without stopping the printing job, according to the characteristics of the continuous feed printer system described above. From this feature, it is assumed that the postprocessor control apparatus 0118 does not rewrite an inspection result after receiving the inspection result NG. Therefore, the postprocessor control apparatus 0118 has a feature that the inspection results cannot be overwritten.

Inspection Apparatus Software [FIG. 3]

FIG. 3 is a diagram illustrating a configuration of a program included in the inspection apparatus 0108.

A boot loader 301 is a program executed immediately after the power of the inspection apparatus 0108 is turned on. This program includes a program for executing various startup sequences required for starting the system.

The operating system 302 is a program that provides an execution environment for various programs that realize the functions of the inspection apparatus 0108. This provides functions such as resource control of the memory of the inspection apparatus 0108, i.e., a RAM 0227, the storage unit 0228, and the like.

The network control program 303 is a program executed when transmitting and receiving data to and from equipment connected via the network 0113. That is, it is used to receive control instructions from the client computer 0110, Furthermore, it is also used to notify the inspection result of the printed book ID to the postprocessor control apparatus 0118 connected via the network 0113. A reception program 304 is a program for receiving image data scanned by the inspection unit 0106 through the cable 0114.

An inspection preprocessing program 305 is a program used for generating an inspection job by performing, reference image generation, assignment of a book ID of a print job, or the like. An inspection program 306 is a program for collating the image data received by the reception program 304 with respect to the inspection job generated by the inspection preprocessing program 305. An inspection postprocessing program 307 is a program for managing a result of inspection by the inspection program 306, and executing processing for notifying a postprocessor control apparatus 0118 of the inspection result of the print data by using the network control program 303.

Figure 4A:
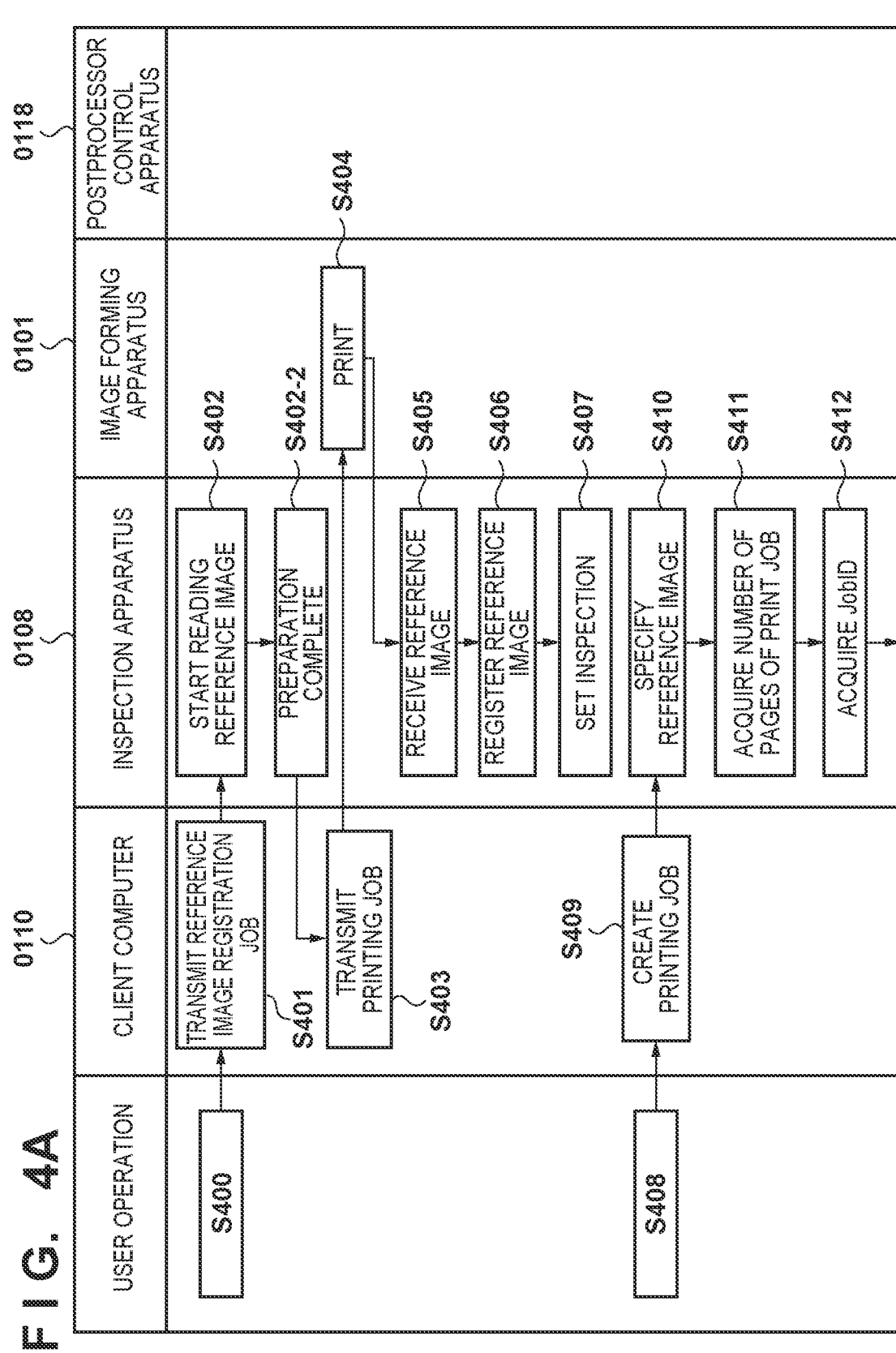

Inspection Process [FIG. 4A and FIG. 4B]

Hereinafter, the inspection processing according to the present embodiment will be described with reference to a system flow diagram for explaining the processing flow of the entire inspection processing system. The program of the image forming apparatus 0101 according to the present flow is stored in the storage unit 0205 of the image forming apparatus 0101, is read out to the RAM 0202, and is executed by the CPU 0201. The program of the inspection apparatus 0108 according to the present flow is stored in the storage unit 0228 of the inspection apparatus 0108, is read out to the RAM 0227, and is executed by the CPU 0226. The program of the client computer 0110 according to the present flow is stored in a storage unit 0244 of the client computer 0110, is read out to a RAM 0242, and is executed by a CPU 0243. The program of the postprocessor control apparatus 0118 according to the present flow is stored in the storage unit 0254 of the postprocessor control apparatus 0118, is read out to the RAM 0252, and is executed by the CPU 0253.

FIG. 4A and FIG. 4B are system flows diagram of the client computer 0110, the inspection apparatus 0108, the image forming apparatus 0101, the postprocessor control apparatus 0118, and a user who is an operator of these apparatuses when using functions provided by the system.

The user operations indicated in step S400, step S408 and step S423 realize a series of flows illustrated in the same figure by the user. To this end, "user operation" is a column indicating the contents of operations that are instructed on the screen provided by the client computer 0110 and indicates a relationship of the flow generated as a result of the operations.

The user instructs the client computer 0110 to register the reference image in step S400. For example, the user performs an operation of pressing a test print button.

In step S401, the client computer 0110 creates a job for instructing registration of a reference image to be compared with an inspection target, and transmits the job to the inspection apparatus 0108.

In step S402, the inspection apparatus 0108, after receiving the job for registering the reference image, starts preparing to read the reference image and completes the preparation. In this preparation process, the start of reading the reference image is notified to the inspection apparatus I/F 0215 via the inspection unit I/F 0231. When preparation completes, a message indicating that preparation has completed is transmitted to the client computer 0110 (step S402-2).

In step S403, the client computer 0110, after receiving the preparation complete message, transmits a print job with the number of copies set to 1 to the image forming apparatus 0101 via the information processing apparatus 0109.

In step S404, the image forming apparatus 0101 prints PDF data included in the print job. Then, the inspection unit 0106 scans and reads a printed image when it passes through the sheet conveying path.

In step S405, the inspection apparatus 0108 receives the scanned image from the inspection unit 0106.

In step S406, the inspection apparatus 0108 registers the image received in step S405 as a reference image in the RAM 0227. At this time, a plurality of reference images may be read and the user may be allowed to select from among them, a plurality of images may be synthesized, or a plurality of reference images may be registered.

In step S407, the inspection apparatus 0108 displays an inspection parameter setting screen (not illustrated) on the display unit 0245. When the display unit 0245 receives a "completion" instruction on the inspection parameter setting screen, it ends the flow of the reference image registration job. At this time, reference image identification information may be added to the registered reference image (or group of reference images) and the reference image identification information may be notified to the client computer 0110. In this case, a reference image may be designated by the reference image identification information in a control file received from the client computer 0110, which will be described later.

The number of reference images to be read is the number of pages to be inspected (front side and back side of each sheet). In the inspection unit 0106, the conveyance of the sheet is detected by a sensor, for example, and the reference image is acquired by scanning the detected sheet. In order to reduce the processing load, the edge of the sheet may be detected, outside of the edge may be trimmed, and the result may be stored as an image of a corresponding size. In this case, the size may also be stored. Acquired reference images are also stored identifiably in the order of acquisition so that they can be referenced in the order of acquisition at the time of inspection.

In order to associate the registered reference image with the print job to be inspected, the reference image identification information may be used as described above, or it may be determined that the registered reference image is associated with the print job immediately after the registration. In the former case, the registered reference image can be reused for additional printing. In this case, the quality inspection can be performed on additional print materials based on the same evaluation standard as that of the original print materials.

As described above, the reference image is registered in the inspection apparatus by scanning a non-defective product, and the reference image and print material to be inspected are associated with each other.

After registering the reference images, the user instructs the client computer 0110 to execute the inspection in step S408. For example, the user selects the data to be printed and performs an operation of pressing the print button.

In step S409, the client computer 0110 creates a print job based on the selected data and transmits a control file that corresponds to the print job to the inspection apparatus 0108. Details of the control file will be described later with reference to FIG. 6. At this time, since the job ID of the print job to be inspected is acquired, the job ID may be newly associated with the registered reference image.

In step S410, the inspection apparatus 0108 acquires a reference image corresponding to the print job in response to the instruction of step S409. If the reference image is registered in association with the information for associating with the print job, the reference image associated with the print job may be acquired. Alternatively, if it is associated with the print job immediately after the reference image registration, the most recent registered reference image may be acquired.

In step S411, the inspection apparatus 0108 acquires the number of pages of the print job from the number of reference images acquired in step S410, and stores them in the RAM 0227. For example, when the inspection apparatus 0108 acquires five reference images, 5 is stored as the number of pages of the print job.

In step S412 and step S413, the inspection apparatus 0108 acquires JobID and the number of copies included in the control file received in step S409, and stores them in the RAM 0227.

In step S414, the inspection apparatus 0108 sets the initial value 0 as the copy number, and stores it in the RAM 0227.

In step S415, the inspection apparatus 0108 prepares for the inspection of a print job associated with the reference image and the reading of the inspection target image by the inspection unit 0106. The inspection unit 0106 scans the sheet to be conveyed thereafter and transmits it to the inspection apparatus 0108.

Since the preparation for registering the reference image is completed in step S416, the inspection apparatus 0108 waits for reception of a scanned image of a print material.

In step S417, the client computer 0110 transmits a print job to the image forming apparatus 0101 via the information processing apparatus 0109.

The inspection apparatus 0108 that is waiting for preparation of a scanned image in step S416 executes inspection preprocessing in step S418. The detail will be described later with reference to FIG. 5A.

In step S419, the image forming apparatus 0101, after having received the print job, starts printing. In the present embodiment, printing is performed in units of copies. The printed sheet is conveyed to the inspection unit 0106, and the inspection unit 0106 scans both sides of the sheet to read an image. The scanned image is transmitted from the inspection unit 0106 to the inspection apparatus 0108.

In step S420, the inspection apparatus 0108 executes an inspection process. The detail will be described later with reference to FIG. 5B.

The inspection apparatus 0108 and the image forming apparatus 0101 repeat the processes from step S419 to step S420 for the number of pages per copy of the print job.

In step S421, the inspection apparatus 0108 executes inspection postprocessing. This will be described later in more detail using FIG. 5C.

In step S422, the postprocessor control apparatus 0118 receives the inspection result of the printed book from the inspection apparatus 0108. The inspection result may include information indicating that the print quality of the printed image was evaluated and that the result was that the printed image is a non-defective product or a defective product (in units of copies). This information may be associated with a book ID, which is identification information for specifying a book in units of copies.

The inspection apparatus 0108, the image forming apparatus 0101, and the postprocessor control apparatus 0118 repeat the processes from step S418 to step S423 for the number of copies of the print jobs.

The processing from step S418 to step S423 is repeated for each copy of the print job, and then the flow is terminated.

Figure 5A:
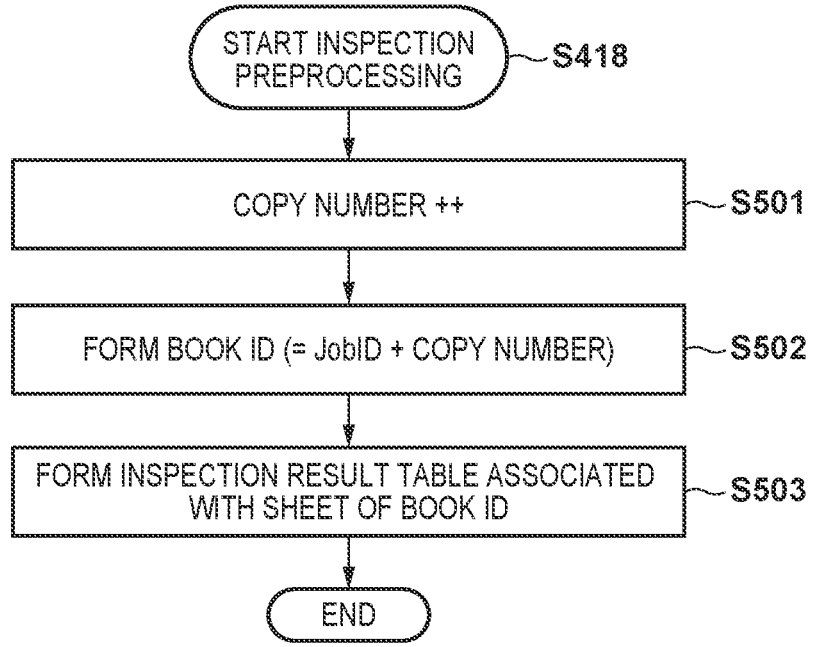
FIG. 5A, FIG. 5B, and FIG. 5C are processing flowcharts of the inspection apparatus in the first embodiment.

Inspection Preprocessing [FIG. 5A]

FIG. 5A is a flowchart for explaining the operation of the inspection preprocessing performed by the inspection apparatus 0108 in step S418.

In step S501, a copy number stored in the RAM 277 is incremented by 1.

In step S502, a book ID is generated by adding JobID and the copy number to be stored in the RAM 277. Since the book ID need only be information indicating the number of the book of the job, the book ID may be set by connecting, for example, a job ID (JobID) and a copy number.

In step S503, a sheet inspection result table associated with the book IDs as illustrated in FIG. 7A and FIG. 7B is generated. FIG. 7A and FIG. 7B will be described later in detail.

The inspection preprocessing flow as described above completes.

Figure 5B:
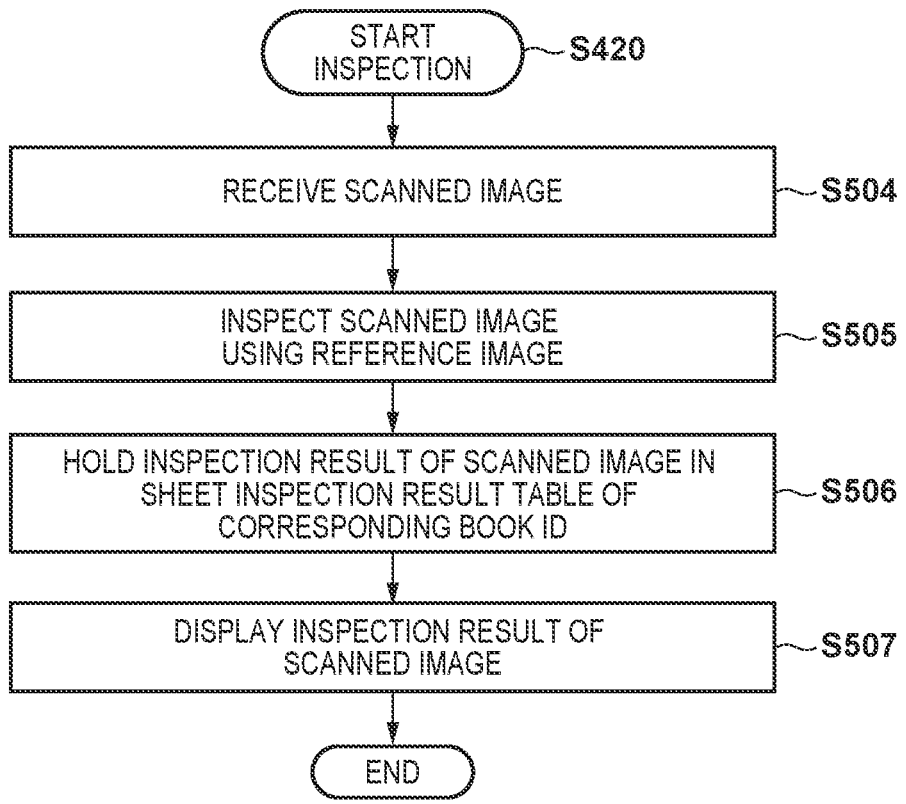

Inspection Processing [FIG. 5B]

FIG. 5B is a flowchart for explaining the operation of the inspection process performed by the inspection apparatus 0108 in step S420.

In step S504, the inspection apparatus 0108 receives a scanned image from the inspection unit 0106 via the inspection apparatus I/F 0215 and the inspection unit I/F 0231. From the inspection unit 0106, images of the front and back sides may be read at one time and received, but in such cases, it is possible to distinguish between the front side and the back side by deciding, for example, the order in which the sides that are sent.

In step S505, a scanned image is inspected by comparing it to a reference image specified in step S410. In the case where the specified reference image includes a plurality of images, each time a scanned image is received, reference images are selected in the order in which they are read, and the two images are compared with each other. In the case of double-sided printing, it may be registered which of the sides a reference image is on at the time of registration, and the reference image on the side that corresponds to the side of the scanned image may be used. Whether or not each page is defective may be determined by comparing the degree of positional deviation or color deviation from the reference image with a reference value, for example. As a result of the comparison, for example, if the difference is within a set allowable range, the page may be judged as a non-defective product, otherwise, it may be judged as a defective product.

In step S506, the inspection result of the scanned image obtained in step S505 is added to a result column 705 of the sheet inspection result table illustrated in FIG. 6 which is generated in step S503. At the same time, an inspection time 704 is also added, In step S507, inspection results of the scanned images obtained in step S505 are displayed on an inspection results screen (not illustrated). Since the inspection proceeds for each sheet to be inspected, for example, the book ID and the inspection result indicating whether each sheet is a non-defective product (OK) or a defective product (NG) may be displayed in a list or the like in accordance with the ongoing inspection.

The inspection process flow as described above completes. Note that the printing process of step S419 and the inspection process of step S420 are repeatedly performed until all pages included in one copy, i.e., one book, are printed.

Further, the processing from the inspection preprocessing of step S418 to the inspection postprocessing of step S421 and the processing up to the transmission of the inspection result to the postprocessor control apparatus 0118 of step S422 are repeatedly executed for each book, that is, in book units.

Figure 5C:
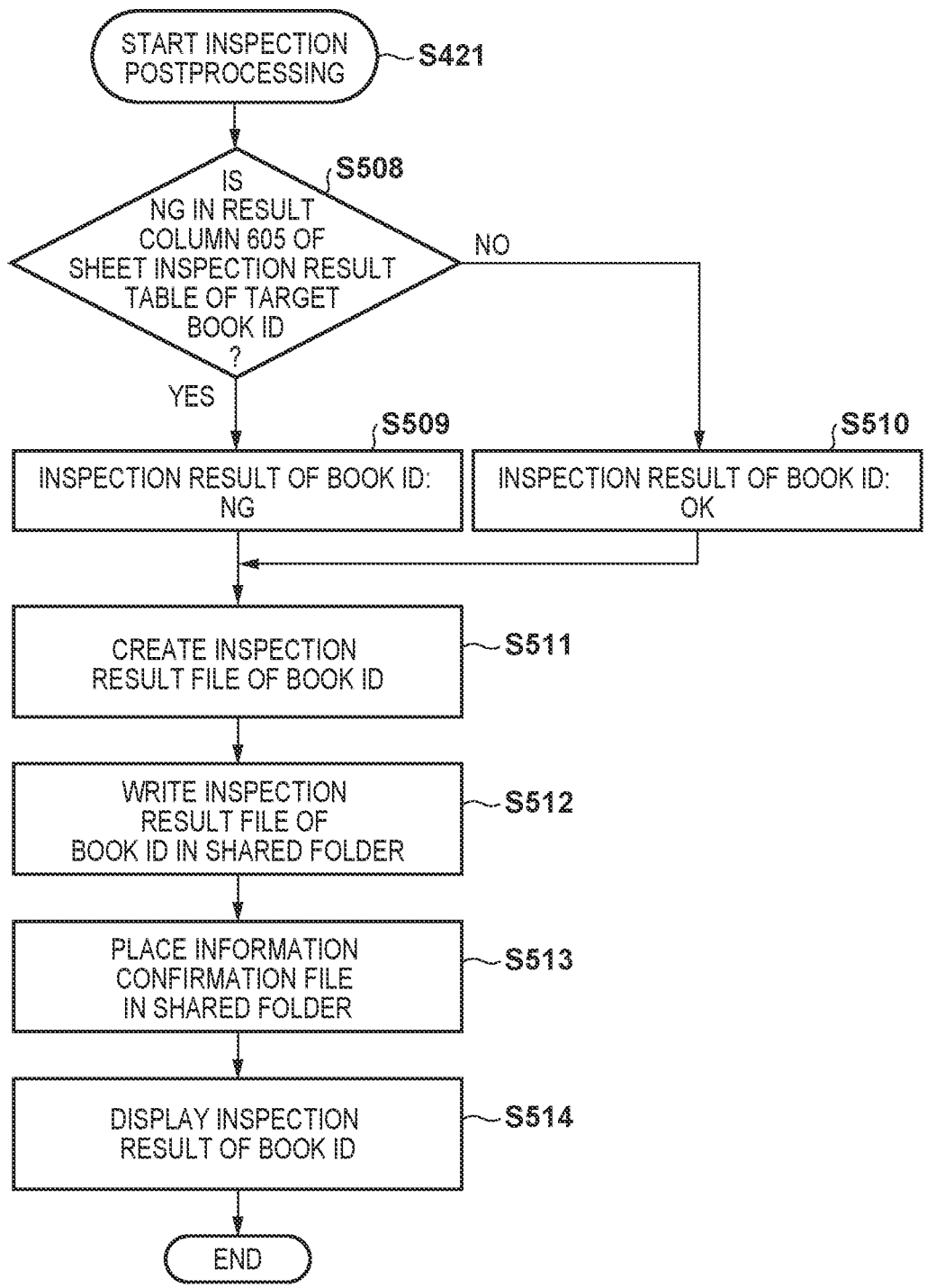

Inspection Postprocessing [FIG. 5C]

FIG. 5C is a flowchart for explaining the operation of the inspection postprocessing performed by the inspection apparatus 0108 in step S421.

In step S508, the sheet inspection result table of a book ID of interest illustrated in FIG. 7A is referred to, and it is judged whether or not there is an NG in the result column 705 in the table. That is, it is determined whether there is a page that is a defective product. When it is determined that there is an NG (step S508: Yes), the inspection result for the book ID is set as NG (step S509). When it is determined that there is no NG (step S508: No), the inspection result for the book ID is set as OK (step S510).

In step S511, using the inspection result of the book ID determined in step S509 or step S510, a book inspection result file associated with the book ID as illustrated in FIG. 7B is created. The detail will be described later with reference to FIG. 7B.

In step S512, a book inspection result file created in step S511 is stored in a shared folder provided in the RAM 0252 of the inspection apparatus 0108. For the uniqueness of the file, the book ID may be included in the file name of the book inspection result file.

In step S513, an information confirmation file (not illustrated) indicating that inspection of the book specified in the book ID has been completed is placed in the shared folder. The information confirmation file may indicate the end of the inspection for each book by its presence. The postprocessor control apparatus 0118 reads the inspection result for the book indicated by the book ID from the book inspection result file created in step S511, triggered by the information confirmation file being placed in the shared folder.

In step S514, the inspection apparatus 0108 displays the inspection result for the book ID on an inspection result screen (not illustrated).

The inspection postprocessing flow as described above completes.

Control File [FIG. 6]

FIG. 6 illustrates an example of a control file generated by the client computer 0110 and transmitted to the inspection apparatus 0108. The control file represents an overview of a print job and is used to convey the information of a print job to a device such as the inspection apparatus 0108.

A root element 600 represents the root element of the control file and corresponds to one print job. A job ID element 601 represents identification information for uniquely identifying a job. A reference image identifier element 602 is identification information used by the inspection apparatus 0108 for the purpose of specifying a reference image.

A number of copies element 603 is the number of copies of the print job. The number of copies of a print job means how many times the same print is repeated for one element in the print queue. For example, if the number of pages of one copy is 10, a number of copies element 603 specifies how many copies of all 10 of those pages are to be printed (how many times to print the job). The number of copies of the print job is used to determine how many times the inspection is performed at the time of the inspection. If a value smaller than the actual number of copies is inputted in the number of copies element 603 of the print job in the control file, there will be a problem that print materials to be inspected will not be inspected. Therefore, the number of copies element 603 of the print job of the control file must have the same value as the number of copies specified in the print job.

A number of scans element 604 is the number of times to scan a print material to be used when a reference image is registered. The number of scans specifies how many times anon-defective product should be scanned when creating a reference image. If a reference image is obtained by synthesizing images obtained by scanning a non-defective product multiple times, inspection accuracy is increased because noise in the reference image is reduced. Conversely, if the number of non-defective product scans is small, noise in the reference image is noticeable and inspection accuracy is lower.

Since the control file is transmitted from the client computer 0110 to the inspection apparatus 0108 in step S409 of FIG. 4A, the reference image of the corresponding print job is already registered when the inspection apparatus 0108 receives the control file. Therefore, the inspection apparatus 0108 may ignore the number of scans element 604 of the control file. Alternatively, the number of scans element 604 may be transmitted to the inspection apparatus 0108 in a reference image registration job, and the reference image may be scanned the specified number of times, and the results thereof are synthesized, and registered. In this case, for example, the value of the number of scans element may be set as the number of copies to be printed for obtaining the reference image.

A collation setting element 605 indicates whether or not collation is set for a print job. When printing multiple copies without the collation setting, the printing process proceeds in a manner that does the printing of each page collectively (first page, first page, first page), rather than in units of books (first page, second page, third page, for example). Therefore, the presence or absence of the collation setting is also used for determining whether or not to also perform the inspection in the order: first page, first page, and first page. In the present embodiment, it is assumed that printing is performed without the collation setting, that is, in units of books.

The double-sided print setting element 606 is a double-sided print setting for print jobs. The double-sided print setting is used for judging whether or not the back side as well as the front side of the print materials is to be inspected.

A sheet size element 607 is a sheet size specified for the print job. The number of sheets element 608 records the number of sheets per book. Since it is possible to specify whether the sheet is single-sided/double-sided by the double-sided print setting element 606, the number of pages may be set instead of the number of sheets.

The control file may be transmitted to the inspection apparatus prior to transmitting a print job (step S401) for registering the reference image. In this case, the reference image identification information 602 is determined by the client computer 0110, and the receiving inspection apparatus 0108 registers the reference image in association with the identification information.

Sheet Inspection Result Table and Inspection Result Files [FIG. 7A and FIG. 7B]

FIG. 7A illustrates an exemplary sheet inspection result table 700 generated by the inspection apparatus 0108 in the inspection preprocessing in step S418. The sheet inspection result table 700 includes a book ID column 701, a bar code column 702, a page column 703, a time column 704, and a result column 705. The sheet inspection result table 700 is generated by the inspection apparatus 0108 in step S503 of FIG. 5A. Specifically, the inspection apparatus 0108 generates a row corresponding to the number of pages of the print job acquired in step S411, and fills each row of the page column 703 with the page number in the inspection order. As the inspection target information, the book ID generated in step S502 is filled in the book ID column 701, and the bar code information corresponding to the book ID is filled in the bar code column 702. In the example of FIG. 7A, one copy is composed of five pages. In the present embodiment, the inspection apparatus 0108 determines that the number of reference images received from the image forming apparatus 0101 corresponds to the number of pages of one copy. For example, when five reference images are received, it is determined that one copy is composed of five pages. In the example of FIG. 7A, an example of a copy is illustrated. However, a sheet inspection result table for a plurality of copies may be created. More specifically, the inspection apparatus 0108 repeatedly compares the scan image received at the time of inspection with the reference image of the first page to fifth page, thereby performing inspection of a plurality of copies and creating a sheet inspection result table for a plurality of inspected copies. For example, when the inspection apparatus 0108 acquires a scan image of 15 pages at the time of inspection, a three-part sheet inspection result table is created. As another method of acquiring the number of copies and the number of pages, the inspection apparatus 0108 may acquire these from the image forming apparatus 0101 or another apparatus.

The bar code information may be printed, for example, in the margin of the corresponding book. The bar code is a type of imaged information indicating a book ID, and other codes may be used.

The sheet inspection result table 700 is completed by inputting the inspection result by the inspection apparatus 0108 in step S506. More specifically, the inspection result acquired in step S505 is filled into the result column 705, and the inspection time is filled into the time column 704. By repeating this for each of the pages, the sheet inspection result table 700 corresponding to the book ID is completed.

FIG. 7B illustrates an exemplary inspection result file (book ID inspection result file) 706 corresponding to the book ID generated by the inspection apparatus 0108 in the inspection postprocessing in step S510.

The hook ID inspection result file 706 consists of a table of a book ID column 707, a bar code column 708, a time column 709, and a result column 710.

The book ID inspection result file 706 is generated by the inspection apparatus 0108 in step S511. Specifically, the book ID is acquired from the book ID column 701 of the sheet inspection result table, and the book ID column 707 is filled. The bar code corresponding to the book ID is acquired from the bar code column 702 of the sheet inspection result table 700, and the bar code column 708 is filled. Then, the inspection result of the book ID determined in step S509 or step S510 is filled in the result column 710, and the time is filled in the time column 709. With the above, the book ID inspection result file 706 is completed.

Post-processing

The inspection result file stored in the shared file in step S512 of FIG. 5C is referred to by the postprocessor control apparatus 0118 to determine whether a book to be processed is a non-defective product or a defective product upon the trigger of storage of the information confirmation file. The book and the inspection result file may be synchronized by, for example, adjusting the storage timing of the information confirmation file in step S513 to the timing at which the sheets of the book unit are conveyed from the buffer unit 0115 to the post-processing apparatus 0116. Alternatively, when printing, a bar code corresponding to the book ID may be printed on the margin of the first page or of each page, for example. The post-processing apparatus 0116 may read the bar code to generate a book ID, and may refer to the inspection result file of the matching book ID to determine whether the product is a non-defective product or a defective product. The inspection apparatus 0108, after determining the book ID from the bar code, may transmit to the image forming apparatus 0101 in step S418 of FIG. 4B, for example, to thereby print. Alternatively, a book ID may be transmitted from the inspection apparatus 0108 to the client computer 0110 prior to sending a print job (step S417) from the client computer 0110. In this case, the client computer 0110 may synthesize the received bar code into the margin of the print data before transmitting the job. It is needless to say that other methods may be used to synchronize the book to be post-processed with the inspection result In this manner, inspection results in units of books that are the inspection target are referred to by the postprocessor control apparatus 0118. The postprocessor control apparatus 0118 performs post-processing, for example, binding, for a book whose inspection result indicates a non-defective product, and discards a book whose inspection result indicates a defective product without performing post-processing. The discharge may be performed, for example, by discharging defective products to a discharge unit therefor.

According to the above-described configuration and processing procedure, even if a defect in the print materials is found by the inspection apparatus 0108, it is converted into an inspection result (in units of books) and transmitted to the postprocessor control apparatus 0118, so that the image forming apparatus can continue printing without performing reprinting. Therefore, it is not necessary to prepare for reprinting or perform reprinting processing itself, and the productivity of the cutsheet device can be improved. Further, since defective products can be checked in units of books on the basis of inspection results of the inspection apparatus 0108, the quality of print materials can be maintained at the same level as when reprinting is performed.

Second Embodiment

One of the features of cutsheet devices that is not in continuous feed printers is stoppage of printing upon a paper jam. In general, when a jam occurs in a cutsheet device, printing is interrupted, and sheets remaining in the machine are manually removed. Thereafter, the sheets from where the jam occurred are automatically reprinted in the printing machine. That is, in relation to a jam generated in a cutsheet printing system, printing is in units of sheets after the sheet removed due to the jam, and thereby it is possible to complete the product to be generated. This is called jam recovery. However, missing pages and duplicate pages may occur during jam recovery.

When the jam occurrence position is upstream of the inspection unit 0106, a deviation occurs in the inspection target page when a page omission or page duplication occurs, so it is possible to detect the jam occurrence position by inspection by the inspection apparatus 0108. However, in the case of a jam occurring downstream of the inspection unit 0106, when page omission or duplication occurs, the jam position cannot be detected by inspection by the inspection apparatus in some cases.

Figure 11:
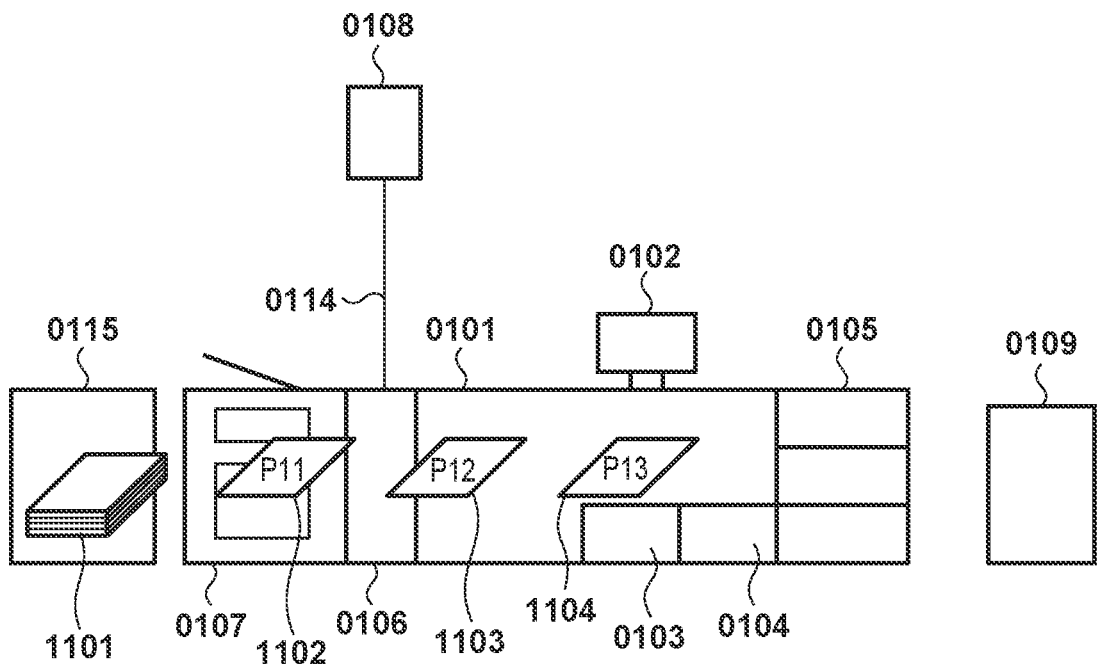
FIG. 11 is a diagram illustrating an example of a state in which a sheet is conveyed in a printing system.

As a specific example, a situation as illustrated in FIG. 11 is assumed. In this case, the sheets from the first page to the tenth page are stacked in the buffer unit 0115 as a printed sheet bundle 1101. Since the sheet 1102 of the 11th page is downstream of the inspection unit 0106, its inspection has been completed, and the sheet 1103 of the 12th page and the sheet 1104 of the 13th page are upstream of the inspection unit 0106, so those sheets have not been inspected. At this time, the inspection apparatus 0108 is in a state of waiting for reception of the not yet inspected sheet 1103 of the 12th page. For example, when a jam occurs at the sheet 1102 of the 11th page which is downstream of the inspection unit 0106, the pages from the sheet 1102 of the 11th page are reprinted as the jam recovery operation. For example, if an error where the page is missing for the sheet 1102 of the 11th page has occurred at this time, jam recovery may occur from the sheet 1103 of the 12th page. In this case, the inspection apparatus 0108 will end up inspecting the sheet 1103 of the 12th page whose reception is being awaited, and can continue inspecting, but as a result, the sheet 1102 of the 11th page will be missed. Meanwhile, when a jam occurs at the sheet 1103 of the 12th page which is upstream of the inspection unit 0106, the pages from the sheet of the 12th page will be reprinted. For example, there are error cases where jam recovery will occur from the sheet 1102 of the 11th page or from the sheet 1104 of the 13th page if the page is missing or there is duplication for the sheet 1103 of the 12th page. In such a case, since the inspection apparatus 0108 expects to receive the sheet 1103 of the 12th page, it is possible to detect that the inspection target page is shifted. Therefore, in a case where a jam occurs downstream of the inspection unit, if a paper jam occurs, the printing company needs to confirm whether there is a page omission or a page duplication in the final product.

In the following embodiment, a description will be given of an example of processing in the case where there is a possibility that page omission or duplication will occur due to a jam which is a phenomenon specific to cutsheet devices. In the second embodiment, a case will be described in which the user is notified of a book ID and a page number at which page omission or duplication may occur due to jam, and the user themself inspects the completed book. Downstream of the inspection unit 0106, a paper jam occurs between step S419 and step S421 of FIG. 4. FIG. 8 illustrates a system flow diagram for when a paper jam occurs in the second embodiment.

When a paper jam occurs in the image forming apparatus 0101 between step S419 and step S421, the image forming apparatus 0101 stops the printing in step S801.

In step S802, the image forming apparatus 0101 notifies the inspection apparatus 0108 of the jam information. The jam information includes, for example, position information indicating where the jam occurred, a book ID for which the jam occurred, a page number for which the jam occurred, and the like.

In step S803, the inspection apparatus 0108 notifies the user by voice or display, for example, of the book ID for which the jam has occurred and the page number at which a jam has occurred from the jam information acquired in step S802.

In the present embodiment, in step S802 and step S803, the inspection apparatus 0108 receives jam information and notifies the user of the jam information, but the present invention is not limited to this, and the client computer 0110 may notify the user of the jam information.

In step S804, the user removes sheets that remain in the image forming apparatus 0101, that is, performs a jam process in response to the jam. In step S805, the image forming apparatus 0101 restarts printing from the page at which the jam occurred in the jam recovery process. Thereafter, the processing from step S806 to step S811 is the same as the processing from step S419 to step S423. When resuming printing, the inspection apparatus 0108 may be notified of the page from which to resume the printing. In doing so, the inspection apparatus 0108 can specify the reference image of the page whose printing has been resumed and continue the inspection.

As described above, in the present embodiment, the user is able to perform jam processing since the user is notified of the jam information as illustrated in step S803. In addition, the user can prevent the occurrence of page omissions or duplication by inspecting the book corresponding to the jam information from a completed book, for example, by referring to the book ID and the page number for which the jam occurrence was notified.

Third Embodiment

In the second embodiment, an example is described in which jam information is notified to the user. It was necessary for the user themself to inspect the completed book in order to guarantee that there are no page omissions or duplicates.

In the third embodiment, an example will be described in which the sheet being printed is removed when a jam occurs, and printing is resumed from the copy being printed, in order to ensure that there is no page omission or duplication without the user inspecting the completed book.

Paper jams occur between step S419 and step S421. FIG. 9 illustrates a system flow diagram for when a paper jam occurs in the third embodiment.

When a paper jam occurs between step S419 and step S421, the image forming apparatus 0101 stops the printing in step S901.

In step S902, the image forming apparatus 0101 notifies the client computer 0110 that a jam occurred.

In step S903, the client computer 0110 instructs the image forming apparatus 0101 to suspend the job being printed.

In step S904, the image forming apparatus 0101 receives an instruction from the client computer 0110 and interrupts the job. Furthermore, the image forming apparatus 0101 notifies the inspection apparatus 0108 of suspension of the job. This notification may be sent from the client computer 0110 to the inspection apparatus 0108.

In step S905, the inspection apparatus 0108 discards the sheet inspection result table 700 held in association with the interrupted job.

In step S906, the inspection apparatus 0108 instructs the user to remove all sheets being printed. This instruction may be performed by voice or display, for example. In the present embodiment, in step S906, it takes a form of an instruction given from the inspection apparatus 0108 to the user, but the present invention is not limited thereto, and it may also take a form in which the instruction is given to the user from the client computer 0110.

Figure 12:
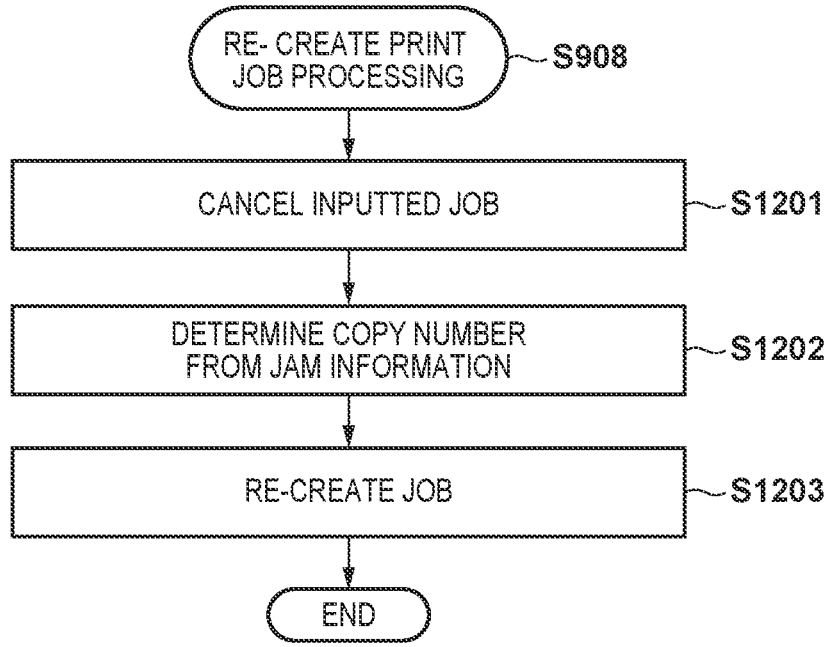
FIG. 12 is a flowchart for inspection preprocessing.

In step S907, the user receives an instruction of step S906, and removes the printed sheets and removes sheets that remain within the device. In step S908, the client computer 0110 recreates the interrupted print job in step S903. Specifically, with reference to FIG. 12, description will be given for an operation in the case where a jam occurs in the large-capacity stacker 0107 on the 90th page of the third copy in a job having 100 pages, 10 copies and a job ID of 1000, for example.

In step S1201, the client computer 0110 cancels the printing job being printed by the image forming apparatus 0101. In step S1202, the client computer 0110 specifies the copy number for which the jam occurred from the jam information notified from the image forming apparatus 0101 in step S902. In this example, it is determined that the copy number is 3. The copy number is a number indicating a copy when printing a plurality of copies. It is assumed that the client computer 0110 holds job status information 1301 as illustrated in FIG. 13 in, for example, the storage unit 0244 for the job being printed, in order for the client computer 0110 to specify the copy number at which the jam has occurred.

The job status information 1301 includes information on a job ID 1302, a copy number 1303, a page number 1304, a job input state 1305 of the image forming apparatus 0101, and a normal discharge state 1306 in the image forming apparatus. In the present embodiment, it is assumed that, for a job whose job ID 1302 is 1000, the copy number 1303 holds the numbers 1 to 10 and the page number 1304 holds the numbers 1 to 100 as the job status information. The client computer 0110 also holds a job input state 1305 of the image forming apparatus corresponding to each page number 1304, and a normal discharge state 1306 corresponding to each page number 1304. The job input state 1305 indicates whether the corresponding page of the corresponding copy number of the corresponding job has been inputted or not. The normal discharge state 1306 indicates whether or not the corresponding page of the corresponding copy number of the corresponding job has been successfully discharged. The client computer 0110 inputs an output instruction for each page to the image forming apparatus 0101, and the client computer updates the job input state 1305 in conjunction therewith. The image forming apparatus 0101 prints the page received from the client computer 0110 and notifies the client computer of the information (normal discharge information) as an event in units of pages when normal discharge is completed. It is assumed that the client computer updates the normal discharge state 1306 in response to this event.

When a jam occurs in the large-capacity stacker 0107 at the 90th page of the third copy of a job of 100 pages and 10 copies whose job ID is 1000, the image forming apparatus 0101 notifies the client computer 0110 of the jam occurrence information. Further, the image forming apparatus 0101 discharges sheets that remain in the machine. At this time, for a page that is being conveyed in the machine downstream of the jammed sheet, for example, page 89 and therebefore, if normal discharge is performed, normal discharge information is notified by an event to the client computer 0110 about that page. Meanwhile, it is assumed that an escape discharge is performed from a page which is being conveyed in the machine upstream of a sheet in which a jam has occurred, for example, the 91st and subsequent pages, and the sheets are discharged to a discharge destination different from the normal discharge tray, and normal discharge information is not notified. As a result, the client computer 0110 can specify the page number 1304 that is not normally discharged in the normal discharge state 1306 after it is updated based on the occurrence of the jam and the normal discharge information. As a result, the client computer 0110 can acquire the job ID 1302, the copy number 1303, and the page number 1304 at which the jam occurred. For example, based on the normal discharge state 1306, the first page among the pages identified as not being normally discharged can be identified as the page for which the jam occurred. However, as the method for counting normal discharges at the time of occurrence of the jam, a method in which all sheets remaining in the device at the time of occurrence of the jam are removed by the user and are not counted as normal discharge sheets may be used.

In step S1203, the client computer 0110 re-creates the job. At this time, the number of copies to be printed is the number of copies from copy number 3 determined to be the copy for which the jam occurred in step S1202, i.e., 8 copies, out of the number of copies 10 of the job canceled in step S1201. It is also assumed that the job ID for which the job is to be re-created in step S1203 is 1000, which is the same as the job ID of the job canceled in step S1201, and the copy number is also started from copy number 3 as determined in step S1202. By the process of step S908 described above, the client computer can resume the print job from the beginning of the copy number at which the jam occurred. Then, in step S909, the client computer 0110 transmits a print job to the image forming apparatus 0101 via the information processing apparatus 0109. Thereafter, the processing from step S910 to step S915 is the same as the processing from step S418 to step S423.

As described above, in the present embodiment, the sheets being printed including printed sheets are removed by the user, and the print job is recreated by the client computer 0110. By doing so, it is possible to resume printing from the copy (book) for which the jam occurred, and as a result, it is possible to guarantee that there are no page omissions or duplicates.

Fourth Embodiment

In the third embodiment, an example has been described in which printing is restarted from the copy at which the jam occurred. However, the user needs to remove the printed sheets of the book to be reprinted, in addition to removing the sheets remaining in the device, which is normal jam processing. Therefore, the target of removal changes depending on the jam.

In the fourth embodiment, an example will be described in which all the inspection results of books having a book ID for which page omission or duplication may occur are made to be NG. Thus, it can be guaranteed that there is no page omission or duplication by the user removing sheets remaining in the device, which is a normal jam process.

Figure 10:
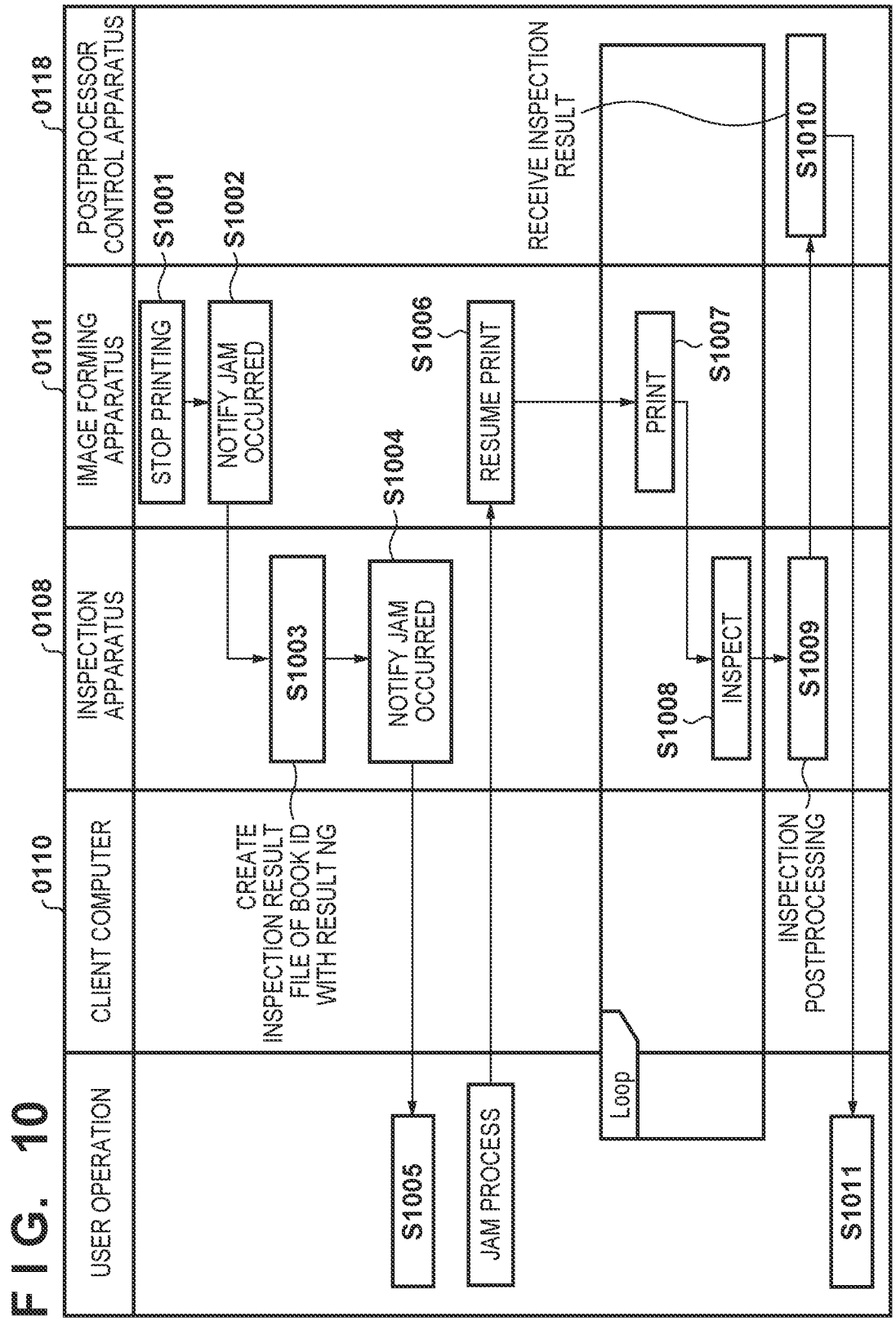
FIG. 10 is a system flowchart for the entire inspection process system in a fourth embodiment.

A paper jam occurs between step S419 and step S421 of FIG. 4. FIG. 10 illustrates a system flow diagram for when a paper jam occurs in the fourth embodiment. When a paper jam occurs between step S419 and step S421, the image forming apparatus 0101 stops the printing in step S1001. In step S1002, the image forming apparatus 0101 notifies the inspection apparatus 0108 of the jam.

In step S1003, the inspection apparatus 0108 creates an inspection result file of the hook being printed. At this time, NG (fail) is filled into the result column 710 of the book ID of the book being printed. If the jammed sheet is near the start or the end of the book, the sheets removed from the conveyance path may span a plurality of books. For this reason, the result column 710 of the corresponding book ID may be set to NG for all books that have a possibility of page duplication or omission, that is, books that include sheets in the conveyance path at the time of occurrence of a jam. The book IDs including the sheets in the conveyance path can be estimated based on the position of the sheet on the conveyance path, for example, because printing is performed in units of books.

In step S1004, the inspection apparatus 0108 notifies the user that a jam has occurred. In the present embodiment, in step S1004, it takes a form of a notification of the occurrence of a jam from the inspection apparatus 0108 to the user, but the present invention is not limited thereto, and it may also take a form in which the notification is given to the user from the client computer 0110, In step S1005, the user receives the notification of step S1004 and performs the jam process. In step S1006, the image forming apparatus restarts the print by the jam recovery process. Thereafter, the processing from step S1007 to step S1008 is the same as the processing from step S419 to step S420.

When the image forming apparatus 0101 completes the printing of the number of pages of the print job, the inspection apparatus 0108 executes the inspection postprocessing in step S1009. In the inspection postprocessing in the present embodiment, when the inspection result file is created in step S1003, the processing of FIG. 5C is performed with respect to the book but the processing from step S508 to step S511 is skipped. Then, the inspection result file created in step S1003 is written in the shared folder with the postprocessor control apparatus 0118 in step S512. For this purpose, for example, when the occurrence of a jam is notified in step S1004, the occurrence of the jam is stored as jam information. The jam information may be referred to in step S1009, and if a jam occurs, the created inspection result file file may be written in the shared folder as described above. At this time, the jam information is rewritten to a value indicating a state in which no jam has occurred. Thereafter, the processing from step S1010 to step S1011 is the same as the processing from step S422 to step S423.

As described above, in the present embodiment, when a jam that may cause page omission or duplication occurs, the inspection result for the book ID of the book including the sheet for which the jam has occurred is set to NG. By doing so, if there is a page for which a jam has occurred, NG is recorded as an inspection result in the book inspection result file of the book including that page, and the book is processed by the postprocessor control apparatus 0118 as a failure. Thus, the user does not have to remove it. As described above, when a jam occurs, the user only needs to remove the sheet in the transport path, and it is not necessary to remove the sheet placed on the buffer unit 0115. Therefore, the user can perform jam processing without being aware of the position at which the jam occurred, and as a result, can guarantee that there are no page omissions or duplicates.

Fifth Embodiment

In the second embodiment, the third embodiment, and the fourth embodiment, description has been given of embodiments assuming a case where page omission or duplication occurs due to jam recovery. Even when the jam recovery processing is appropriately performed in accordance with these embodiments, depending on the position where the jam occurs, there are cases where the inspection processing will always be NG. In the following embodiments, processing in such cases will be described.

In the fifth embodiment, a case where a jam occurs downstream of the inspection unit 0106 will be described. In the process of inspecting a scanned image using the reference image of step S505 of FIG. 5B, the inspection apparatus 0108 compares a scanned image each time it receives one from the inspection unit 0106 in step S504 with the reference image it holds. To explain with FIG. 11 as an example, the sheet 1102 of the 11th page downstream of the inspection unit 0106 has been scanned by, the inspection unit 0106, that is, the inspection apparatus 0108 has performed the inspection. At this time, the inspection apparatus 0108 is waiting for a scan image of the sheet 1103 of the 12th page which is next. When a jam occurs at the sheet 1102 of the 11th page, the pages from the sheet 1102 of the 11th page are reprinted as the jam recovery operation. In that case, the next scan image received by the inspection apparatus 0108 from the inspection unit 0106 will be a scan image of the sheet 1102 of the 11th page, and an inconsistency will occur with the sheet 1103 of the 12th page that is on standby.

Figure 14:
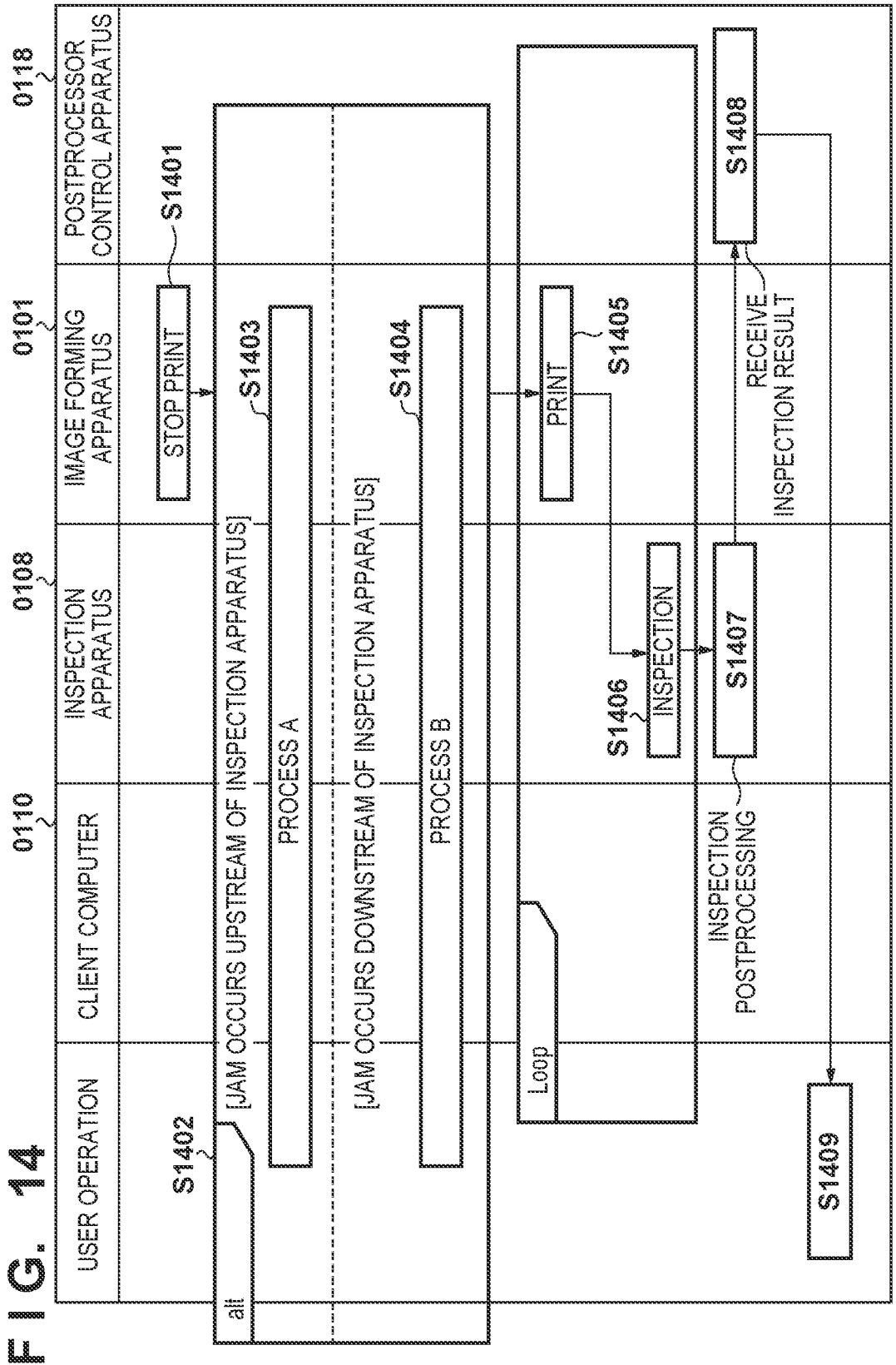
FIG. 14 is a system flowchart for an entire inspection process system in a fifth embodiment.

On the other hand, when a jam occurs on the upstream side of the inspection unit 0106, for example, when a jam occurs at the sheet 1103 of the 12th page in FIG. 11, pages from the sheet 1103 of the 12th page are reprinted as a jam recovery operation. In that case, the next scan image received by the inspection apparatus 0108 from the inspection unit 0106 will be a scan image of the sheet 1103 of the 12th page, and an inconsistency will not occur with the sheet 1103 of the 12th page that was on standby. From the above, in the case where a jam occurs downstream of the inspection unit 0106, even if the jam is eliminated and printing is restarted, the inspection result is always NG. Therefore, in the present embodiment, processing is performed so that such a problem does not occur. This example will be described with reference to FIG. 4 and FIG. 14.

When a paper jam occurs between step S419 (print) and step S421 (the inspection postprocessing) of FIG. 4, the image forming apparatus 0101 stops the printing in step S1401. In step S1402, the process branches depending on whether the jam-occurrence position is upstream or downstream of the inspection unit 0106.

Figure 17D:
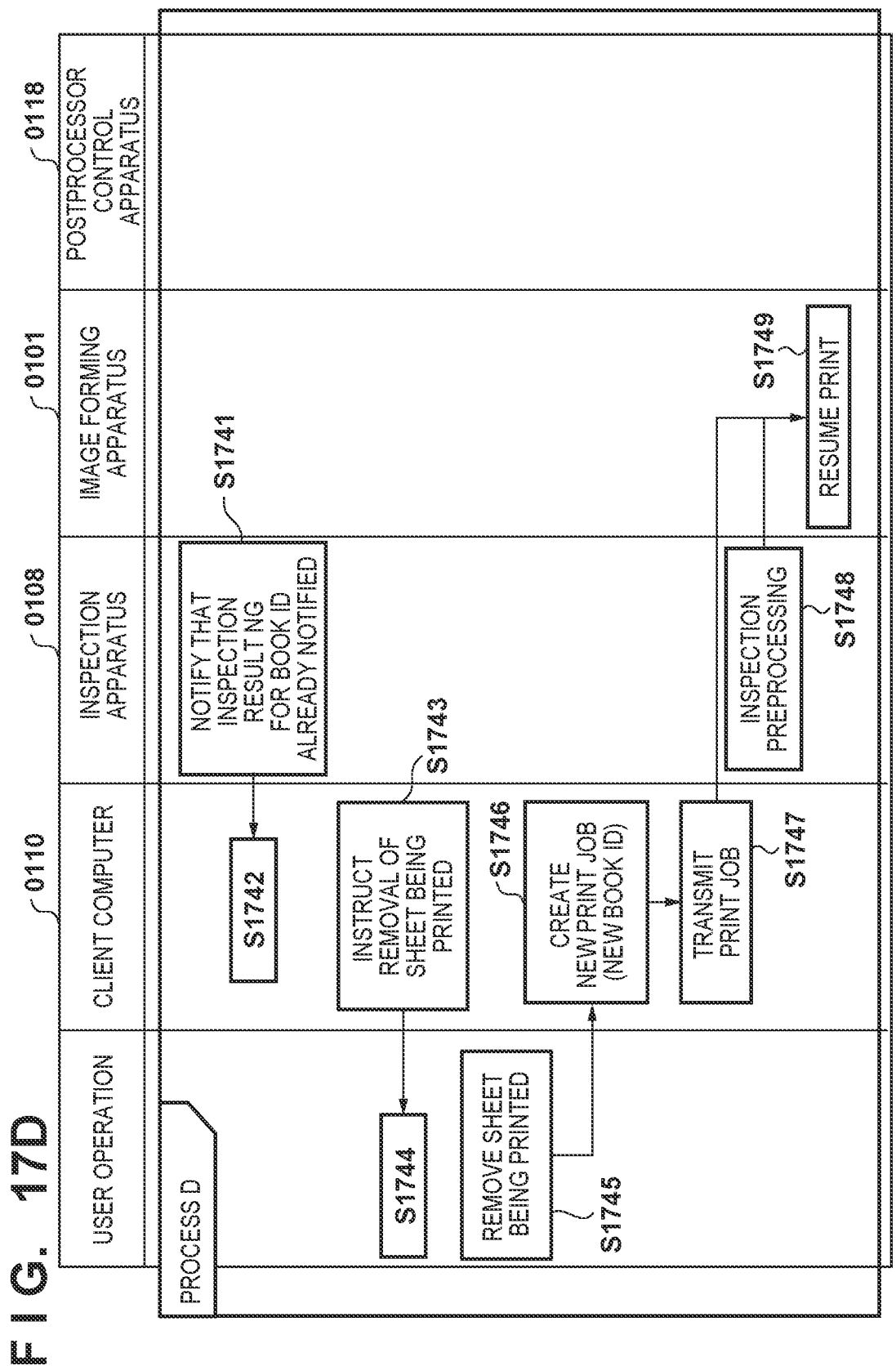
FIG. 17D is a flowchart for a process D.

When the jamming occurrence position is upstream of the inspection unit 0106 in step S1402, the process A illustrated in FIG. 17A is performed in step S1403. In step S1711, the image forming apparatus 0101 notifies the client computer 0110 of the occurrence of a jam based on the jam information. In step S1712, the client computer 0110 instructs the user to remove sheets remaining in the image forming apparatus by jamming. This instruction may be performed by voice or display, for example (step S1713). In the present embodiment, the client computer 0110 instructs the user, but the present invention is not limited thereto, and the inspection apparatus 0108 may instruct the user. In step S1714, the user receives an instruction of step S1713 and removes the remaining sheets in the device. In step S1715, the image forming apparatus restarts printing from the page at which the jam occurred in accordance with the jam recovery process.

When the jamming occurrence position is downstream of the inspection unit 0106 in step S1402, the process B illustrated in FIG. 17B is performed in step S1404. In step S1721, the image forming apparatus 0101 notifies the inspection apparatus 0108 and the client computer 0110 of the occurrence of a jam based on the jam information. In step S1722, the inspection apparatus 0108 discards the held sheet inspection result table 700. What is discarded is an inspection result of a book to be reprinted, and may be an inspection result corresponding to a book containing a sheet to be removed for jam elimination. If sheets to be removed span a plurality of books, the inspection results of these books are discarded. In step S1723, the client computer 0110 instructs the user to remove sheets remaining in the image forming apparatus. The instruction is transmitted to the user in step S1724. In step S1725, the user receives an instruction of step S1723 and removes the sheets remaining in the device. In step S1726, the client computer 0110 creates a new print job to initiate priming with a new book ID. The client computer 0110 cancels the printing job being printed by the image forming apparatus 0101 as the jam recovery process. However, the determination as to whether or not to create a new print job can be made based on whether or not the jam occurrence position in the jam information notified in step S1721 is downstream of the inspection unit 0106. That is, if the jam occurrence position is downstream of the inspection unit 0106, a new print job is created. Since this determination is completed in step S1402, cancellation of a job that is being executed and creation of a new job may be performed unconditionally in step S1726. In addition, the job newly created in step S1726 shall start from the copy following the copy number of the job for which the jam occurred, and the job ID shall be made to be the same as the job ID of the canceled job.

As a result, a job with a new job ID that is different from the job ID of the book for which the jam occurred can be generated. Also, the copy number to be recreated may be determined in the same manner as in step S1202 of FIG. 12. As a result, the copy number is updated, and the book ID of the book to be reprinted is different from the book in which the jam occurred. In step S1727, the client computer 0110 transmits a job of the new job ID created in step S1726 to the image forming apparatus 0101. Further, in step S1728, the inspection apparatus 0108 performs the inspection preprocessing in the same processing as that of step S418. Thus, the printing process interrupted by the jam can be restarted from the interrupted book with the new book ID, and the sheet inspection result table associated with the new book ID can be generated. In step S1729, the image forming apparatus 0101 starts printing a job received from the client computer 0110 in step S1727. The inspection apparatus 0108 waits for the first page of the book of the book ID to be printed next, and performs inspection. Thereafter, the processing from step S1405 to step S1409 is the same as the processing from step S419 to step S423.

In the present embodiment as described above, the process branches depending on whether the jam-occurrence position is upstream or downstream of the inspection unit 0106. In the case of upstream, normal jam recovery processing is performed. In the downstream case, in the same recovery processing as in the case where a jam occurs upstream, the inspection result of print materials after the jam is always NG due to the deviation of the page at the time of the inspection. Therefore, by recreating a job of a new book ID and resuming printing and inspection in units of books, it is possible to prevent a deviation between the printed page and the inspection target page, and to start printing and inspection without waste.

Sixth Embodiment

In the fifth embodiment, an example in which the process branches depending on whether the jam-occurrence position is upstream or downstream of the inspection unit 0106 is described. According to this, when a jam occurs upstream of the inspection unit 0106, pages after the sheet for which the jam has occurred are reprinted in the jam recovery. Meanwhile, when a jam occurs in the buffer unit 0115 downstream of the inspection unit 0106, the jam recovery operation is not reprinting in units of pages, but reprinting in units of copies, that is, reprinting from the start of the book at which the jam occurs. Therefore, it is necessary to remove sheets of the book including a page at which the jam has occurred from the sheet bundle stacked on the buffer unit 0115.

Figure 15:
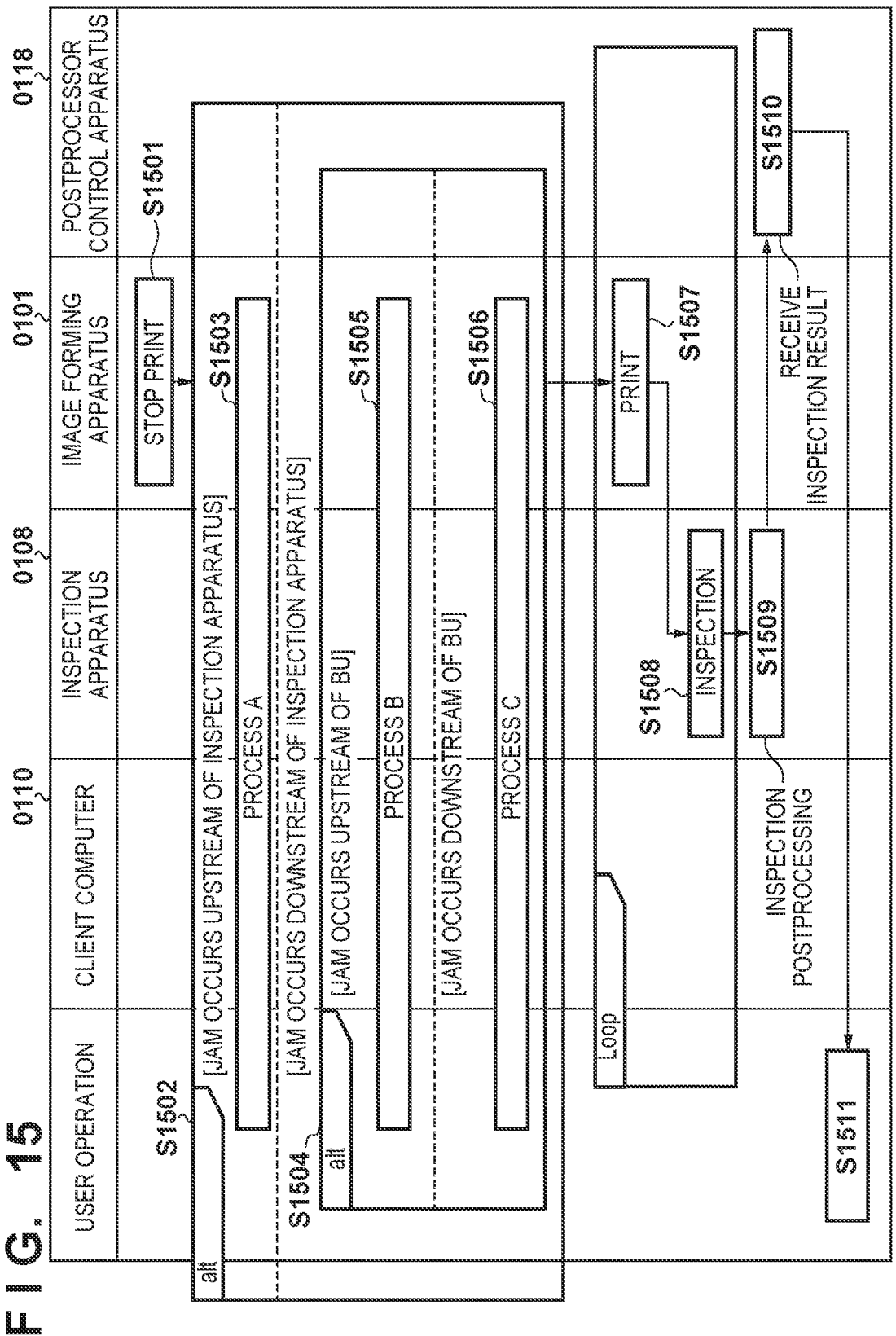
FIG. 15 is a flowchart for the entire inspection process system in a sixth embodiment.

In the sixth embodiment, an example in which the process branches depending on whether the jam-occurrence position is upstream or downstream of the buffer unit 0115 is described. When a jam occurs in the buffer unit 0115, it is reprinted from the start of the copy in the jam recovery process. Therefore, as in the fifth embodiment, inconsistency occurs with respect to the inspection image that the inspection apparatus 0108 is awaiting. An example of this case will be described with reference to FIG. 15.

When a paper jam occurs between step S419 (print) and step S421 (the inspection postprocessing) of FIG. 4, the image forming apparatus 0101 stops the printing in step S1501. In step S1502, the process branches depending on whether the jam-occurrence position is upstream or downstream of the inspection unit 0106.

When the jamming occurrence position is upstream of the inspection unit 0106 in step S1502, the process A illustrated in FIG. 17A is performed in step S1503. The process A performed in step S1503 is the same as step S1403 of FIG. 14. That is, when the jam is resolved, printing is continued from the sheet in which the jam has occurred.

When the jam occurrence position is downstream of the inspection unit 0106 in step S1502, the process branches depending on whether the jam occurrence position is upstream or downstream of the buffer unit 0115 in step S1504.

When the jamming occurrence position is upstream of the buffer unit 0115 in step S1504, the process B illustrated in FIG. 17B is performed in step S1505. The process B performed in step S1505 is the same as step S1404 of FIG. 14. That is, when the jam is resolved, printing is continued from the start of the book that includes the sheet for which the jam has occurred. At this time, the book ID of the book to be reprinted is a book ID that is different from that of the book for which the jam occurred. Specifically, the copy number of the book of the jam is skipped, and printing resumes from the book ID for which the next copy number is combined with the job ID.

When the jamming occurrence position is downstream of the buffer unit 0115 in step S1504, the process C illustrated in FIG. 17C is performed in step S1506. In step S1731, the image forming apparatus 0101 notifies the inspection apparatus 0108 and the client computer 0110 of the occurrence of a jam. In step S1732, the inspection apparatus 0108 initializes the held sheet inspection result table 700. The initialization target is an inspection result of pages to be reprinted, and may be an inspection result of a book including a sheet removed in accordance with a jam and an inspection result corresponding to a page printed and inspected after the book. In step S1733, similarly to step S1712, the client computer 0110 instructs the user to remove sheets remaining in the image forming apparatus, in step S1735, the user receives an instruction of step S1723 and removes the remaining sheets in the device. In step S1736, the client computer 0110 creates a new print job to initiate printing with a new book ID. The client computer 0110 cancels the printing job being printed by the image forming apparatus 0101 as the jam recovery process. Since the process C is executed when a jam occurs downstream of the buffer unit 0115, canceling the job being executed and creating a new print job may always be performed in the process C. The job that is re-created in step S1736 shall start from the same copy number as the copy number of the copy for which the jam occurred, and the job ID shall be made to be the same as the job ID of the canceled job.

As a result, a job with a book ID that is the same as the book ID of the book for which the jam occurred can be generated. Also, the copy number to be recreated may be determined in the same manner as in step S1202 of FIG. 12. In step S1737, the client computer 0110 transmits a job of the new job ID created in step S1736 to the image forming apparatus 0101. In step S1738, the image forming apparatus 0101 starts printing a job received from the client computer 0110 in step S1737. Incidentally, since the inspection apparatus 0108 does not execute the inspection preprocessing in conjunction with resuming printing in step S1738, the inspection can be restarted with the same book ID as the book ID of the book for which the jam occurred. The inspection apparatus 0108 waits for the first page of the book of the hook ID to be printed next, and performs inspection. Thereafter, the processing from step S1507 to step S1511 is the same as the processing from step S419 to step S423.

As described above, in the present embodiment, in addition to whether the jam occurrence position is upstream or downstream of the inspection unit 0106, the processing is divided depending on whether the jam occurrence position is upstream or downstream of the buffer unit 0115. When the jam occurrence position is upstream of the buffer unit 0115, the same processing as that of the fifth embodiment is performed. On the other hand, when the jam occurrence position is downstream of the buffer unit 0115, since the inspection result is always NG in normal, that is units of sheets, jam recovery processing, reprinting is started from the start of the book for which the jam occurred as the jam recovery processing. In addition, the hook ID of the book for which the jam has occurred is taken over as it is as the book ID of the book to be reprinted. Therefore, instead of creating a new hook ID, printing resumes with the same book ID as the book ID that generated the job. As a result, printing and inspection can be performed without waste. For example, even when the inspection result of the book for which the jam has occurred has already been transmitted to the postprocessing apparatus 0116, if the inspection result of the re-printed book is NG, the re-printed hook can be processed as NG also in the postprocessor. In addition, the correspondence between the book and the inspection result can be maintained. However, in the present embodiment, it is assumed that the postprocessor control apparatus 0118 does not overwrite the transmission inspection result when it is NG, and overwrites the transmitted inspection result when it is OK.

Seventh Embodiment

In the sixth embodiment, an example in which, in addition to whether the jam occurrence position is upstream or downstream of the inspection unit 0106, the processing is divided depending on whether the jam occurrence position is upstream or downstream of the buffer unit 0115 is described. Among the jams generated in the buffer unit 0115, the last page of the book may be included in the sheets for which jam recovery is to be performed. In this case, there are times where the inspection result of the book has already been notified from the inspection apparatus 0108 to the postprocessor control apparatus 0118 since the inspection of the book of the jam recovery target has been completed. In the sixth embodiment, when a jam occurs in the buffer unit 0115, reprinting is started from the start of a book having the same book ID as that of the recovery target hook. However, the post-processing apparatus 0116 may have already been notified of the failure (NG) as the inspection result of the book to be reprinted. Even if the inspection result of the book after reprinting is pass (OK), the post-processing apparatus 0116 does not overwrite the inspection result NG. Therefore, in such a case, a book including a page that is first determined to be a failure is discarded even if the inspection result of the reprinted book is pass. That is, the book is always discarded even though it is reprinted from the start of the book. Further, an inconsistency will occur between the number of books of the inspection result OK by the inspection apparatus 0108 and the number of books of the product output by the post-processing apparatus 0116. However, when the inspection result OK has already been notified, the postprocessor control apparatus 0118 can overwrite the inspection result OK with NG.

Figure 16B:
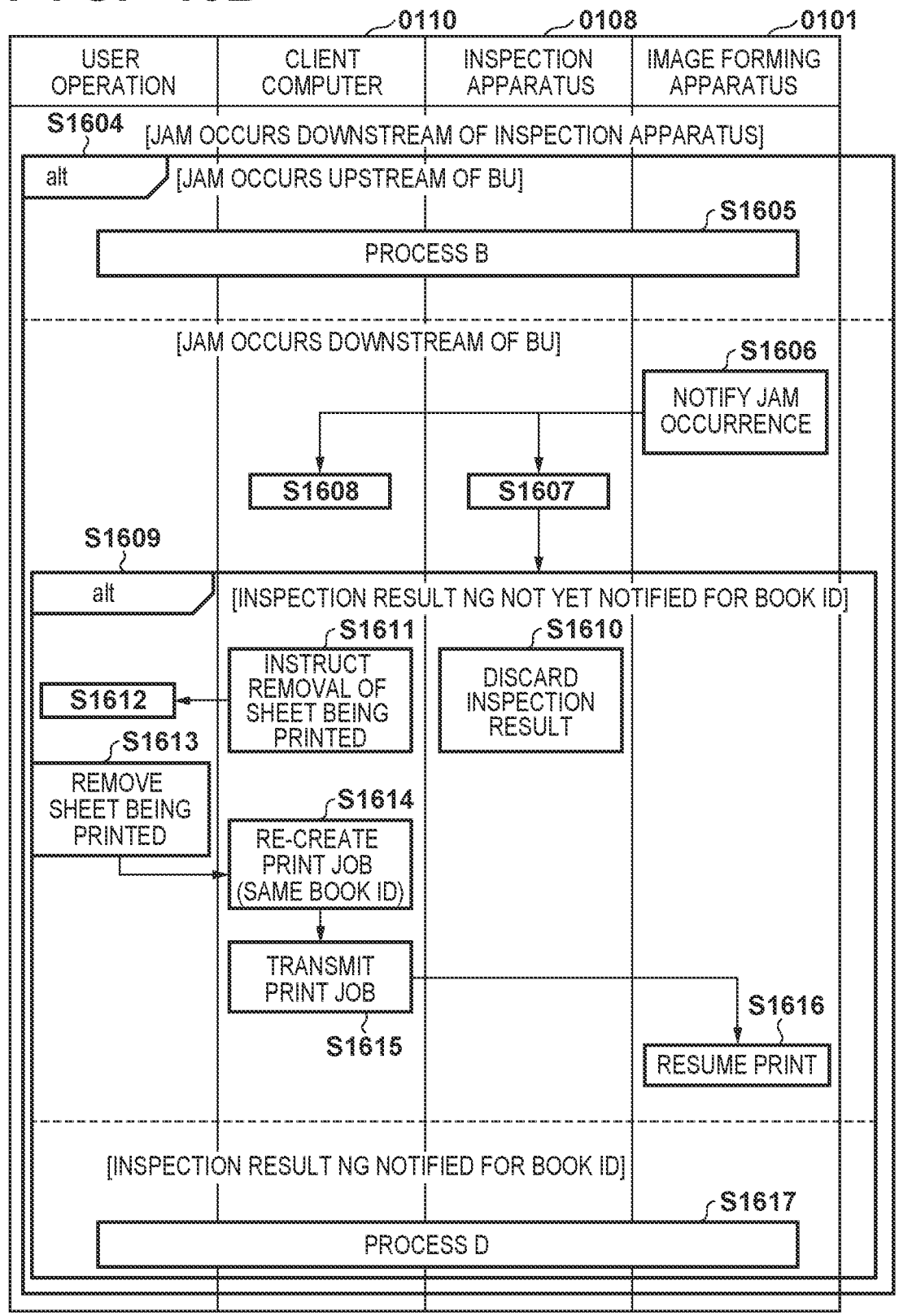
FIG. 16B is a flowchart for the entire inspection process system in a seventh embodiment.

In the seventh embodiment, an example will be described in which, when a jam occurs downstream of the buffer unit 0115, the process branches depending on whether or not the inspection result NG of the book ID of the sheet for which the jam has already occurred has been notified to the postprocessor control apparatus 0118. Here, FIG. 16A and FIG. 16B are referred to. Note that FIG. 16B is a diagram showing a process 16B in FIG. 16A, and these are collectively referred to below as FIG. 16.

When a paper jam occurs between step S419 and step S421 of FIG. 4, the image forming apparatus 0101 stops the printing in step S1601 of FIG. 16. In step S1602, the process branches depending on whether the jam-occurrence position is upstream or downstream of the inspection unit 0106.

When the jamming occurrence position is upstream of the inspection unit 0106 in step S1602, the process A illustrated in FIG. 17A is performed in step S1603. The process A performed in step S1603 is the same as step S1403 of FIG. 14.

When the jam occurrence position is downstream of the inspection unit 0106 in step S1602, the process branches depending on whether the jam occurrence position is upstream or downstream of the buffer unit 0115 in step S1604.

When the jamming occurrence position is upstream of the buffer unit 0115 in step S1604, the process B illustrated in FIG. 17B is performed in step S1605. The process B performed in step S1605 is the same as step S1404 of FIG. 14.

In step S1604, when the jam occurrence location is downstream of the buffer unit 0115, the image forming apparatus 0101 notifies the inspection apparatus 0108 and the client computer 0110 of the jam occurrence by notification in step S1606 of the jam information. The inspection apparatus 0108 and the client computer 0110 are notified of the jamming in step S1607 and in step S1608 respectively. This notification also includes the position where the jam occurred. This is the same in other embodiments.

In step S1609, it is determined whether the inspection result of the book ID that is the target of the jam recovery has been notified. Each of the client computer 0110 and the inspection apparatus 0108 determine whether or not the notification for the book ID of the jam recovery target, the inspection result is NG. For this purpose, for example, the inspection apparatus 0108 notified of the jam information in step S1606 from the image forming apparatus 0101 determines whether or not NG has already been notified for the book ID that is the jam recovery target. Then, the inspection apparatus 0108 may notify the client computer 0110 via the network 0113. At this time, in order for the inspection apparatus 0108 to specify the book ID of the jam recovery target, it is assumed that the inspection apparatus 0108 holds the inspection status information 1801 as shown in FIG. 18.

Assume that the inspection status information 1801 holds information on a job number 1802, a copy number 1803, a page number 1804, an inspection status 1805, and a normal sheet discharge status 1806 in the image forming apparatus 0101. In the present embodiment, it is assumed that the inspection status information 1801 for inspecting a job of 100 pages per copy is held for a job whose job number 1802 is 1000. As a specific example, it is assumed that the current page whose copy number 1803 is 3 and page number 1804 is 1 is already inspected, a jam occurred on the 100th page of the second copy in the buffer unit 0115. The inspection apparatus 0108 performs an inspection process on each page, and the inspection apparatus 0108 updates the inspection status 1805 in conjunction with the inspection process. Also, when the image forming apparatus 0101 prints a page received from the client computer 0110 and completes a normal discharge, it notifies the client computer 0110 and the inspection apparatus 0108 of that information as an event in units of pages. Thus, it is assumed that the inspection apparatus 0108 updates the normal discharge state 1806.

When the first page of the third copy has been inspected and a jam occurs in the buffer unit 0115 on the 100th page of the 2nd copy, the image forming apparatus 0101 notifies the client computer 0110 and the inspection apparatus 0108 of the jam information. In addition, paper that remains in the device is discharged. At this time, pages which are being conveyed in the device downstream of the sheet for which the jam has occurred, for example, page 99 and before of the second copy, are discharged normally, and the normal discharge information is notified to the client computer 0110 and the inspection apparatus 0108 by an event. Meanwhile, it is assumed that an escape discharge is performed from a page which is being conveyed in the device upstream of the sheet at which the jam has occurred, for example, the first page of the third copy, and the discharge is to a discharge destination different from the normal discharge tray, and normal discharge information is not notified. As a result, the inspection apparatus 0108 can acquire the job number 1802, the copy number 1803, and the page number 1804 for which the jam has occurred, by specifying the page number 1804 of a page which has not been normally discharged in the occurrence of the jam and the normal discharge state 1806. However, a method may be used as the normal discharge counting method at the time of occurrence of the jam in which an escape discharge is not performed, and all sheets remaining in the device at the time of occurrence of the jam are removed by the user and are not counted as normal discharge sheets.

As described above, in the present embodiment, it can be determined from the inspection status information 1801 that a jam has occurred on the 100th page of the second copy, and it can be determined from the jam information notified from the image forming apparatus that a jam has occurred in the buffer unit 0115. As described above, the inspection apparatus 0108 can determine the book ID of the jam recovery target from the job number 1802 and the copy number 1803 of the sheet at which the jam has occurred. The inspection apparatus can judge whether or not the determined inspection result of the book ID of the jam recovery target has been notified to the postprocessor control apparatus 0118, and if it has been notified, whether or not the result is OK or NG.

When it is determined in step S1609 that the inspection result NG of the book ID of the jam recovery target is not yet notified, the inspection apparatus 0108 discards the held inspection result of the book ID in step S1610. In step S1611, the client computer 0110 notifies the user of the occurrence of jamming and the removal of sheets being printed. Thereafter, the processing from step S1613 to step S1616 is the same as the processing from step S1735 to step S1739 of FIG. 17C, When it is determined in step S1609 that the inspection result NG of the book ID of the jam recovery target is not yet notified, the process D illustrated in FIG. 17D in step S1617 is executed. In the process D, in step S1741, the inspection apparatus 0108 notifies the client computer 0110 that the inspection result of the book ID of the jam recovery target has been notified to the postprocessor control apparatus 0118 as NG. Also, the client computer 0110 notifies the user of the occurrence of jamming in step S1743 and the removal of sheets being printed. Note that the order of step S1741 and step S1743 is not limited. In step S1745, the user receives an instruction of step S1743 and step S1744 and removes the remaining sheets in the device. In step S1746, the client computer 0110 creates a new print job to initiate printing with a new book ID. The client computer 0110 cancels the printing job being printed by the image forming apparatus 0101 as the jam recovery process. Also, the job that is re-created in step S1746 shall start from the copy number of the copy for which the jam occurred, and the job number shall be made to be the same as the job number of the canceled job.

Thus, it is possible to update the copy number and generate a new book ID different from the book ID of the book for which the jam occurred. Further, the method of specifying the copy number of the job to be recreated is the same as that of step S1202 of FIG. 12, and by this, the copy number of the book to be recreated starts from the next copy number of the book for which the jam occurred. In step S1747, the client computer 0110 transmits a job of the new book ID created in step S1746 to the image forming apparatus 0101. Further, in step S1748, the inspection apparatus 0108 performs the inspection preprocessing is the same processing as that of step S418. In step S1749, the image forming apparatus 0101 starts printing a job received from the client computer 0110 in step S1727. Thereafter, the processing from step S1618 to step S1622 is the same as the processing from step S419 to step S423.

As described above, in the present embodiment, determination is performed as to whether the jam occurrence position is upstream or downstream of the inspection unit 0106, or when it is downstream, whether the jam occurrence position is upstream or downstream of the buffer unit 0115. In addition to that, an example will be described in which, when a jam occurs downstream of the buffer unit 0115, the process branches depending on whether or not the inspection result NG of the book ID of the book for which the jam has occurred has been notified to the postprocessor control apparatus 0118. If a jam recovery is performed on the same book ID in the case where the notification was made, NG is notified even though reprinting is from the start according to jam recovery. Since the inspection result NG cannot be overturned, jam recovery is performed with a new book ID in order to avoid discarding the reprinted hook regardless of the inspection result. As a result, printing and inspection can be started without waste. On the other hand, when the inspection result is not notified, or when the inspection result is OK even if the inspection result is notified, reprinting is performed from the same book ID as that of the book for which the jam occurred. As a result, the correspondence between the inspection result and the book can be maintained.

Eighth Embodiment

Processing when a jam occurs has been described in the second embodiment to the seventh embodiment. In the present embodiment, there is no continuous feed printer inspection apparatus, which is a feature of the inspection apparatus 0108 for a cutsheet device, the processing in accordance with the switching of the inspection mode will be described.

The inspection apparatus 0108 for a cutsheet device has three inspection modes: a log-only mode, a purge mode, and a purge and recovery mode. The log-only mode is a productivity-oriented inspection mode and is an inspection mode in which inspection results are only displayed on the display unit 0245, and sheets whose inspection result is NG are discharged to the discharge destination as usual. The purge mode is an inspection mode in which in addition to displaying the inspection result on the display unit 0245, a sheet whose inspection result is NG is purged to a discharge destination different from the normal discharge destination. Thereby, sheets of the inspection result NG are not mixed in the products discharged to the normal discharge destination. The purge and recovery mode is an inspection mode in which, similarly to the purge mode, a sheet whose inspection result is NG is purged to a different discharge destination from the normal discharge destination, and sheets whose inspection result is NG are not mixed in the product discharged to the normal discharge destination. Also, purged sheets are reprinted. In the first embodiment to seventh embodiment of the present invention, inspection in the log-only mode is assumed.

In the log-only mode, because sheets for which the inspection result is NG are also discharged to the normal discharge destination, there are books mixed in among the completed books whose the inspection result is NG. Therefore, in the first to seventh embodiments, the process of discarding the book of the inspection result NG is performed by notifying the inspection result for each book from the inspection apparatus 0108 to the postprocessor control apparatus 0118. On the other hand, because a sheet whose inspection result is NG is purged to another discharge destination in the purge mode as well, and reprinting of the purged sheet is not performed, there are missing pages for a book whose inspection result is NG among the completed books. Therefore, even in the purge mode, since the book of the inspection result NG needs to be discarded, it is similar to the log-only mode, that is, the same processing as the first embodiment to the seventh embodiment of the present invention can be performed.

However, in the purge and recovery mode, a sheet for which the inspection result is NG is purged to a discharge destination different from the normal discharge destination of the inspection unit 0106, and the purged sheet is reprinted. Therefore, in the purge and recovery mode, the completed book is always a book for which the inspection result is OK. From this feature, in the inspection in the purge and recovery mode, all books that are completed and conveyed to the post-processing apparatus 0116 are books for which the inspection result is OK. Therefore, it is not necessary to notify the postprocessor control apparatus 0118 of the inspection result for each book. Processing in this purge and recovery mode will be described. Note that the reprinting of the purged sheet may be performed by switching the discharge destination to the NG discharge destination when an NG is determined, and instructing the image forming apparatus to stop printing and reprint from the purged sheet. However, even if printing is stopped, the sheet on the conveyance path is discharged from the NG discharge destination of the inspection unit 0106.

Figure 19A:
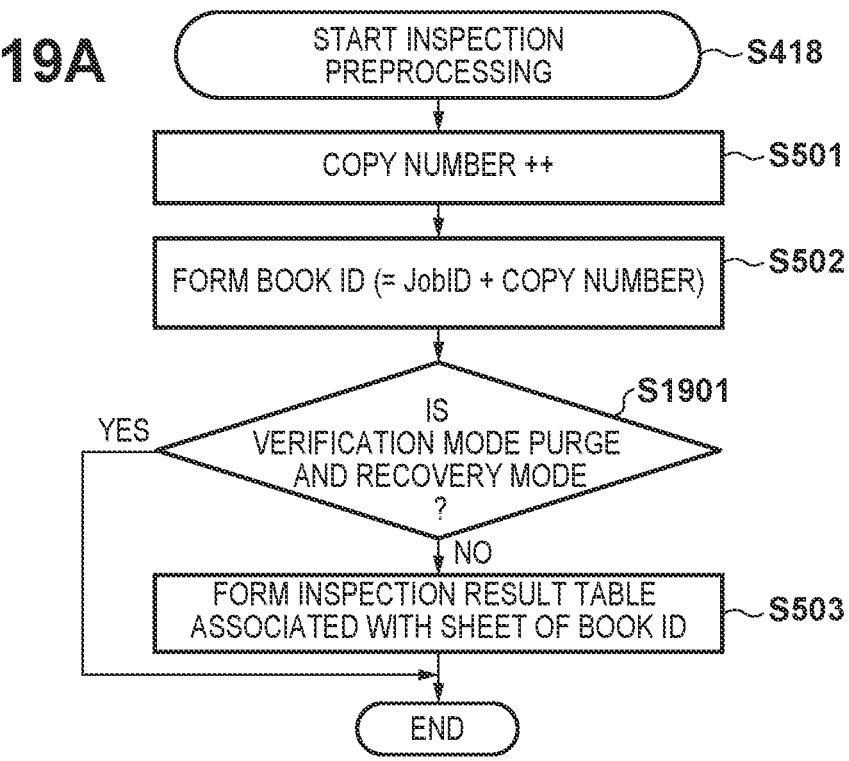
FIG. 19A is a flowchart for inspection preprocessing in an eighth embodiment.
Figure 19B:
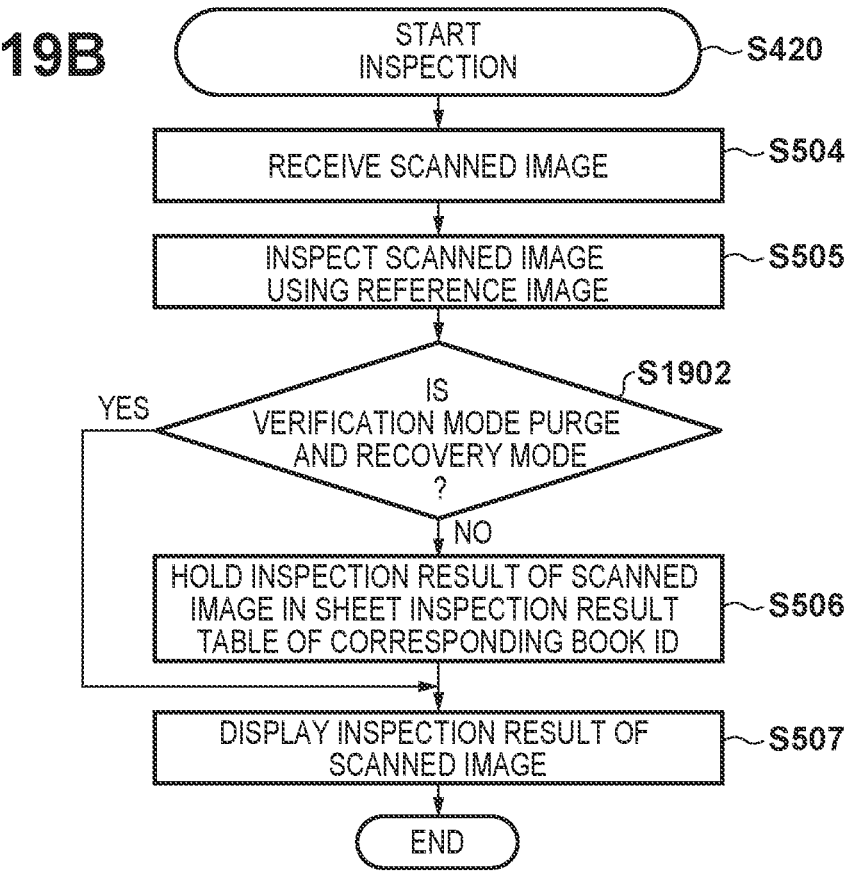
FIG. 19B is a flowchart for an inspection process in the eighth embodiment.
Figure 19C:
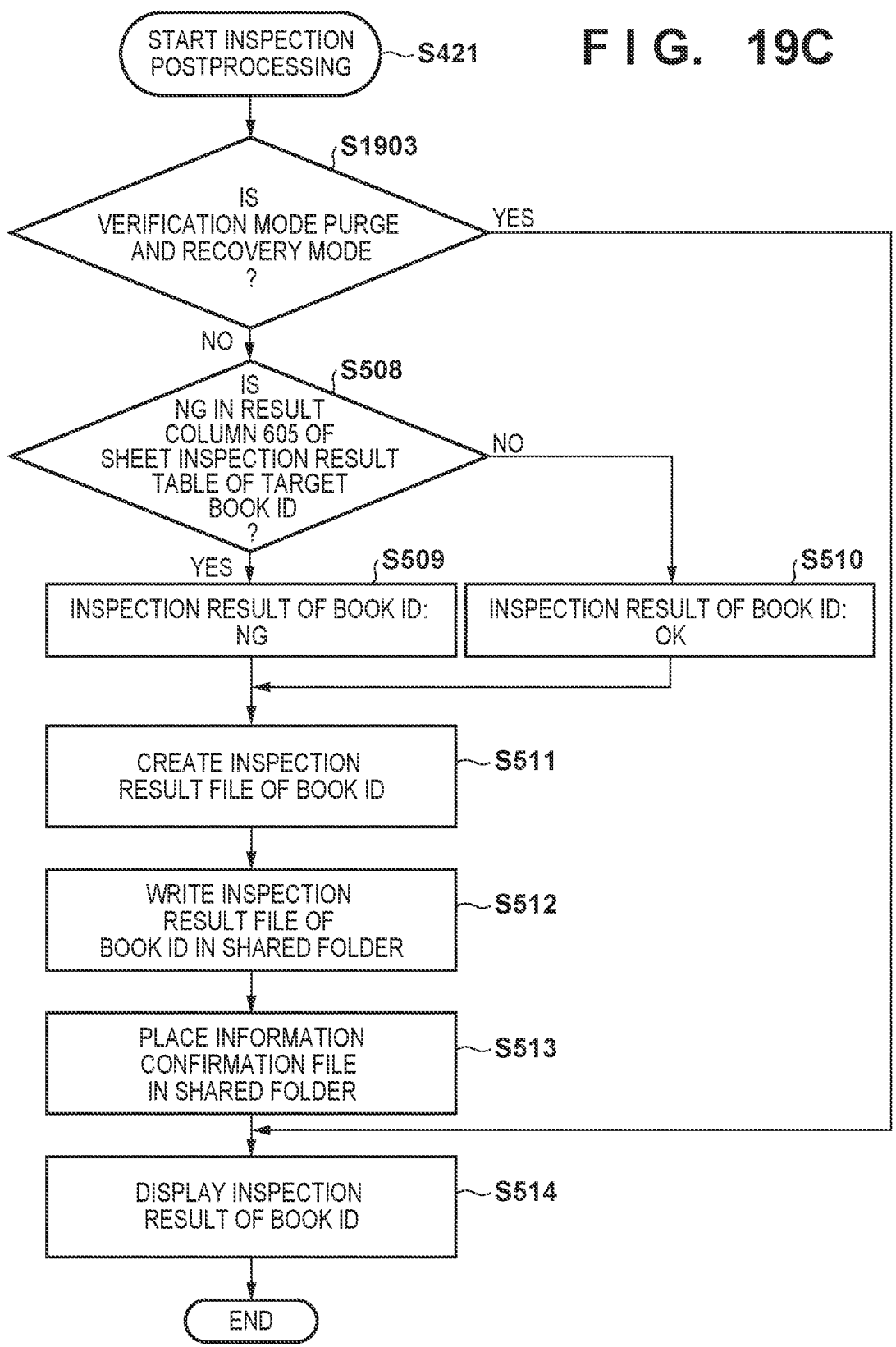
FIG. 19C is a flowchart for inspection postprocessing in the eighth embodiment.

Differences from the log-only mode in processing in the purge and recovery mode are the inspection preprocessing (step S418), the inspection processing (step S420) and the inspection postprocessing (step S421) described in FIG. 5A to FIG. 5C. A flowchart relating to the above-mentioned process in the purge and recovery mode is shown in FIG. 19A, FIG. 19B, and FIG. 19C.

In the log-only mode, the inspection apparatus 0108 generates a sheet inspection result table associated with the book ID as shown in FIG. 7A and FIG. 7B in the processing of step S503 in the inspection preprocessing (step S418). Meanwhile, in purge and recovery mode, all completed books are OK. Therefore, since there is no need to generate a sheet inspection result table for each of the book IDs, in the inspection preprocessing shown in FIG. 19A, it is determined whether or not the inspection mode is the purge and recovery mode in step S1901. When not in purge and recovery mode (step S1901: No), the sheet inspection result table is generated in step S503, and when in purge and recovery mode (step S1901: Yes), the processing in step S503 is skipped.

In the log-only mode, the inspection apparatus 0108 adds the inspection results of the scanned images to the sheet inspection result table 700 shown in FIG. 7A and FIG. 7B h the processing of step S507 in the inspection processing (step S420). On the other hand, in the purge and recovery mode, the generation of the sheet inspection result table is skipped, so that step S506 process does not need to be performed. Therefore, in the inspection process shown in FIG. 19B, it is determined whether or not the inspection mode is the purge and recovery mode in step S1902. When not in the purge and recovery mode (step S1902: No), the inspection result of a scanned image is added to the sheet inspection result table illustrated in FIG. 7A and FIG. 7B in step S506. In the purge and recovery mode (step S1902: YES), step S506 process is skipped.

In the log-only mode, the inspection apparatus 0108 notifies the postprocessor control apparatus 0118 of inspection result of the book ID in the processing of step S513 from step S508 in the inspection postprocessing (step S421). On the other hand, in the case of the purge and recovery mode, since the inspection result of the book ID is always OK, it is not necessary to notify the postprocessor control apparatus 0118 of the inspection result of the book ID. Therefore, in the inspection postprocessing of FIG. 19C, it is determined whether or not the inspection mode is the purge and recovery mode in step S1903. When not in the purge and recovery mode (step S1903: No), the inspection apparatus 0108 notifies the postprocessor control apparatus 0118 of the inspection result of the hook ID by the processing from step S508 to step S513. In the purge and recovery mode (step S1903: YES), by skipping the processing from step S508 to step S513, the notification of the inspection result of the book ID to the postprocessor control apparatus 0118 is skipped.

As described above, since the inspection apparatus 0108 does not notify the inspection result of the book ID to the postprocessor control apparatus 0118 in accordance with the inspection mode, it is possible to realize an expected product in the same manner as in the case of operating in the log-only mode.

In addition, in the present embodiment, processing has been described in which the inspection result of the book ID is not notified to the postprocessor control apparatus 0118, but the inspection result OK of the book ID may always be notified to the postprocessor control apparatus 0118 in the inspection postprocessing (step S421).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions, This application claims the benefit of Japanese Patent Application No. 2020-209552, filed Dec. 17, 2020, Japanese Patent Application No. 2021-131744, filed Aug. 12, 2021, which are hereby incorporated by reference herein in their entirety.

What is claimed is:

1. A non-transitory computer-readable storage medium storing a computer program which, when loaded into a computer and executed, causes the computer to perform a method for controlling an inspection apparatus that is operable to inspect a cut sheet that is supplied to a post-processing apparatus that post-processes sheets in units of books and on which an image has been formed by an image forming apparatus, and that includes an inspection unit configured to inspect an image formed on each sheet, the method comprising:
- managing a result of sheet inspection by the inspection unit for each book including a plurality of sheets;
- managing a sheet inspection result in association with identification information for each book, and recording, as a defective product, an inspection result for a book corresponding to the identification information with which a sheet determined to be a defective product is associated; and
- notifying the inspection result for the book corresponding to the identification information with which a sheet determined to be a defective product is associated.

2. An image forming system comprising:
- an image forming apparatus configured to form an image on a cut sheet;
- an inspection apparatus operable to inspect a cut sheet that is supplied to a post-processing apparatus that post-processes sheets in units of books and on which an image has been formed by the image forming apparatus; and
- a control apparatus configured to control the image forming apparatus and the inspection apparatus, wherein
the inspection apparatus comprises
- an inspection unit configured to inspect an image formed on each sheet;
- one or more processors and one or more memory comprising one or more programs,
- wherein the one or more programs are configured to cause the one or more processors to:
- manage a result of sheet inspection by the inspection unit for each book including a plurality of sheets;
- manage a sheet inspection result in association with identification information for each book, and record, as a defective product, an inspection result for a book corresponding to the identification information with which a sheet determined to be a defective product is associated; and
- notify the inspection result for the book corresponding to the identification information with which a sheet determined to be a defective product is associated.

3. The image forming system according to claim 2, wherein
- the image forming apparatus and the inspection apparatus are connected in-line on a conveying path; and
- in the inspection apparatus, the one or more programs are configured to cause the one or more processors to:
- in accordance with a notification of an occurrence of a jam from the image forming apparatus, cause the image forming apparatus to restart printing from a sheet for which the jam occurred in a case where a position of the occurrence of the jam is upstream of the inspection apparatus, and cause the image forming apparatus to restart printing from the start of a book including a sheet for which the jam occurred in a case where a position of the occurrence of the jam is downstream of inspection apparatus.

4. The image forming system according to claim 3, further comprising a buffer unit connected in-line on a conveyance path downstream of the inspection apparatus,
wherein in the inspection apparatus, the one or more programs are configured to cause the one or more processors to
- in a case where the position of jam occurrence is upstream of the buffer unit, allocate different identification information to the identification information of the book for which the jam occurred as the identification information of the book for which to restart printing, and in a case where the position of jam occurrence is downstream of the buffer unit, allocate the same identification information as the identification information of the book for which the jam occurred as identification information of the book for which printing is restarted.

5. The image forming system according to claim 4,
further comprising a post-processing apparatus configured to perform processing in accordance with the inspection result in units of books received from the inspection apparatus,
wherein, in the inspection apparatus, the one or more programs are configured to cause the one or more processors to
- even if a position of a jam occurrence is downstream of the buffer unit, in a case where an inspection result indicating a defective product has been notified to the post-processing apparatus, allocate identification information that is different from identification information of a book for which the jam occurred as identification information of the book for which printing is restarted.

6. The image forming system according to claim 5, wherein
the post-processing apparatus is a bookbinding apparatus.

7. An inspection apparatus operable to inspect a cut sheet that is supplied to a post-processing apparatus that post-processes sheets in units of books and on which an image has been formed by an image forming apparatus, the inspection apparatus comprising:
- an inspection unit configured to inspect an image formed on each sheet; and
- one or more processors and one or more memory comprising one or more programs,
- wherein the one or more programs are configured to cause the one or more processors to:
- manage a result of sheet inspection by the inspection unit for each book including a plurality of sheets;
- manage a sheet inspection result in association with identification information for each book, and record, as a defective product, an inspection result for a book corresponding to the identification information with which a sheet determined to be a defective product is associated; and
- notify the inspection result for the book corresponding to the identification information with which a sheet determined to be a defective product is associated.

8. The inspection apparatus according to claim 7, wherein the one or more programs are configured to cause the one or more processors to:
- in accordance with a notification of an occurrence of a jam from the image forming apparatus, discard the managed sheet inspection result.

9. The inspection apparatus according to claim 7, wherein the one or more programs are configured to cause the one or more processors to:
- in accordance with a notification of an occurrence of a jam from the image forming apparatus, notify the occurrence of the jam to a user.

10. The inspection apparatus according to claim 7, wherein the one or more programs are configured to cause the one or more processors to:

in accordance with a notification of an occurrence of a jam from the image forming apparatus, record, as a defective product, an inspection result of a book corresponding to the identification information with which a managed sheet is associated.

11. The inspection apparatus according to claim 7, wherein the one or more programs are configured to cause the one or more processors to:

in accordance with a notification of an occurrence of a jam from the image forming apparatus, record, as a defective product, an inspection result of a book corresponding to the identification information with which a sheet that is in a conveyance path from the image forming apparatus is associated.

12. The inspection apparatus according to claim 7, wherein imaged information that indicates the identification information is printed on a sheet associated with the identification information.

13. The inspection apparatus according to claim 7, wherein the inspection unit comprises one or more second processors and one or more second memory comprising one or more second programs, wherein the one or more second programs are configured to cause the one or more second processors to:

evaluate an image formed on a sheet conveyed from the image forming apparatus based on a reference image registered in advance for each sheet to be inspected, and record the evaluation as an inspection result for the sheet.

14. The inspection apparatus according to claim 7, wherein the inspection unit comprises one or more second processors and one or more second memory comprising one or more second programs, wherein the one or more second programs are configured to cause the one or more second processors to:

have a first mode in which a sheet is sent downstream irrespective of an inspection result of a sheet that is inspected, and a second mode in which, in a case where a sheet that is inspected is a defective product, images are caused to be re-formed by the image forming apparatus from that sheet among the plurality of sheets of a corresponding book, wherein the one or more programs are configured to cause the one or more processors to, in a case where the inspection apparatus is in the first mode, notify the inspection result to the post-processing apparatus, and in a case where the inspection apparatus is in the second mode, not notify the inspection result to the post-processing apparatus.

15. The inspection apparatus according to claim 7, wherein the inspection result of each book including a plurality of sheets concerted from a result of sheet inspection by the inspection unit is notified to the post-processing apparatus.

16. The inspection apparatus according to claim 7, wherein the inspection unit has a display unit for displaying information, and the inspection result of each book including a plurality of sheets concerted from result of sheet inspection by the inspection unit is displayed on the display unit.

17. A method for controlling an inspection apparatus operable to inspect a cut sheet that is supplied to a post-processing apparatus that post-processes sheets in units of books and on which an image has been formed by an image forming apparatus, the method comprising:

inspecting an image formed on a sheet for each sheet;

managing a result of sheet inspection by the inspecting for each book including a plurality of sheets;

managing a sheet inspection result in association with identification information for each book, and recording, as a defective product, an inspection result for a book corresponding to the identification information with which a sheet determined to be a defective product is associated; and notifying the inspection result for the book corresponding to the identification information with which a sheet determined to be a defective product is associated.

* * * * *